US012137322B2

(12) United States Patent
Adesokan et al.

(10) Patent No.: US 12,137,322 B2
(45) Date of Patent: Nov. 5, 2024

(54) AUDIO DEVICE WITH DUAL BEAMFORMING

(71) Applicant: GN Audio A/S, Ballerup (DK)

(72) Inventors: Bolaji James Adesokan, Ballerup (DK); Allan Mejlgren Von Bülow, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 66 days.

(21) Appl. No.: 17/936,017

(22) Filed: Sep. 28, 2022

(65) Prior Publication Data

US 2023/0098384 A1 Mar. 30, 2023

(30) Foreign Application Priority Data

Sep. 28, 2021 (EP) .................................... 21199644

(51) Int. Cl.
*H04R 3/00* (2006.01)
*H04R 1/40* (2006.01)

(52) U.S. Cl.
CPC ......... *H04R 1/406* (2013.01); *H04R 2201/40* (2013.01)

(58) Field of Classification Search
CPC ....... H04S 7/302; H04R 5/02; H04R 2430/20; H04R 2499/13
USPC .......................................... 381/303, 92, 122
See application file for complete search history.

(56) References Cited

U.S. PATENT DOCUMENTS

2018/0359572 A1* 12/2018 Jensen ................. H04R 25/407
2019/0043491 A1* 2/2019 Kupryjanow ....... G10L 21/0208
2019/0158965 A1 5/2019 Pedersen

FOREIGN PATENT DOCUMENTS

EP 3413589 A1 12/2018

OTHER PUBLICATIONS

Hori et al., "Multi-microphone speech recognition integrating beamforming, robust feature extraction, and advanced DNN/RNN backend", Computer Speech & Language, vol. 46, Nov. 2017, pp. 401-418, Cited in EESR.
The extended European search report issued in European Application No. 21199644.2, dated Mar. 30, 2022.

* cited by examiner

*Primary Examiner* — Ammar T Hamid
(74) *Attorney, Agent, or Firm* — HSML P. C.

(57) ABSTRACT

An audio device is disclosed, the audio device comprising an interface, memory, and a processor, wherein the processor is configured according to any of the following: obtain a first microphone input signal and a second microphone input signal; process the first microphone input signal and the second microphone input signal for provision of an output audio signal; and output the output audio signal. Processing of the input signals includes determine a first set of covariance parameters and a second set of covariance parameters; determine a first beamforming; apply the first beamforming to the first microphone input signal and the second microphone input signal; determine a second beamforming; apply the second beamforming to the first microphone input signal and the second microphone input signal; and provide the output audio signal based on first beamforming output signal and/or second beamforming output signal.

13 Claims, 6 Drawing Sheets

AUDIO DEVICE WITH DUAL BEAMFORMING

FIELD

The present disclosure relates generally to an audio device, in particular audio devices for improving audio quality and intelligibility, e.g. in voice pick-up.

BACKGROUND

Voice pick-up is an essential task in audio processing and in particular in audio devices. It is known to filter and combine signals from two or more spatially separated microphones to obtain a directional microphone signal. This form of signal processing is generally known as beamforming. The quality of beamformed microphone signals depends on the individual microphones having equal sensitivity characteristics across the relevant frequency range, which, however, is challenged by finite production tolerances and variations in aging and position of components. Further, different noise types/sources have different properties and characteristics that are difficult to handle when present simultaneously, while other speakers in the front half plane of the main speaker appear to be a challenge in the noise suppression.

Further, beamforming with multiple beamformers is facing challenges with respect to stability and computational load.

SUMMARY

Accordingly, there is a need for audio devices which can improve audio quality and intelligibility.

Also, there is a need for audio devices which may mitigate, alleviate, or address the existing shortcomings, for example by improving audio quality and/or intelligibility of voice pick-up in an audio device.

Disclosed herein are examples of an audio device. The audio device comprises an interface. The audio device comprises a memory. The audio device comprises a processor. The processor is configured to obtain a first microphone input signal. The processor is configured to obtain a second microphone input signal. The processor is configured to process the first microphone input signal and the second microphone input signal for provision of an output audio signal. The processor is configured to output the output audio signal.

An audio device is disclosed, the audio device comprising an interface, memory, and a processor, wherein the processor is configured to: obtain a first microphone input signal and a second microphone input signal; process the first microphone input signal and the second microphone input signal for provision of an output audio signal; and output the output audio signal. To process the first microphone input signal and the second microphone input signal comprises to: determine a first set of covariance parameters based on the first microphone input signal and the second microphone input signal; determine a second set of covariance parameters based on the first microphone input signal and the second microphone input signal; determine a first beamforming based on the first set of covariance parameters and/or the second set of covariance parameters; apply the first beamforming to the first microphone input signal and the second microphone input signal for provision of a first beamforming output signal; optionally determine a second beamforming based on the first set of covariance parameters and/or the second set of covariance parameters; optionally apply the second beamforming to the first microphone input signal and the second microphone input signal for provision of a second beamforming output signal; and provide the output audio signal based on the first beamforming output signal and/or the second beamforming output signal. The first beamforming is optionally determined to increase a relative amount of speech of a user in the first beamforming output signal. The second beamforming is optionally determined to decrease a relative amount of speech of the user in the second beamforming output signal.

It is an advantage of the present disclosure that the audio device can be configured to enhance or improve speech quality and intelligibility in audio devices. For example, the influence of microphone characteristics can affect a robust output audio signal. The disclosure can improve robustness of the audio output regardless of the quality of a microphone receiving audio signal.

Further, it is an advantage of the present disclosure to reduce processing requirements for compensating audio via the audio device.

Further, the present disclosure provides an audio device providing improved audio quality and intelligibility of audio signals.

It is an advantage of the present disclosure that a more stable and/or less computationally heavy beamforming is provided.

Advantageously, the present disclosure provides audio devices with a generic and adaptive voice pick up algorithm that can be used for all audio device form factors in all types of environments.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
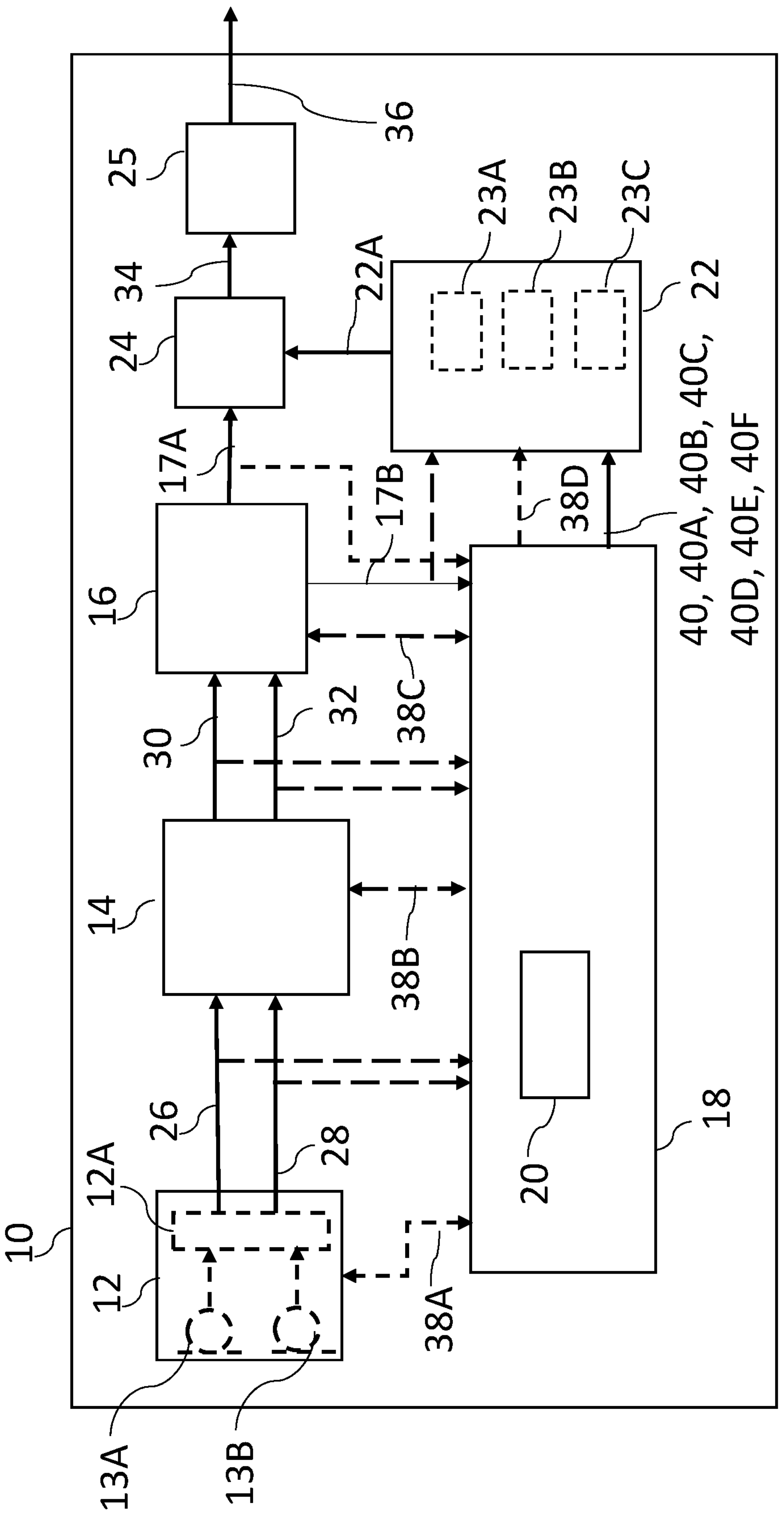
FIG. 1 illustrates an example in-ear audio device according to the disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Disclosed herein are examples of audio devices. Audio devices may be one or more of: headsets, audio signal processors, headphones, computers, mobile phones, tablets, servers, microphones, speakers, software, and applications. The audio device may be a single audio device. The audio device may be a plurality of interconnected audio devices, such as a system. The audio device may be configured to process audio. The audio device can be configured to output audio. The audio device can be configured to obtain, such as receive, audio.

The audio device comprises an interface, memory, and a processor.

The processor is configured to obtain a first microphone input signal and/or a second microphone input signal; process the first microphone input signal and/or the second microphone input signal for provision of an output audio signal; and output the output audio signal. The first microphone input signal and the second microphone signal may be multi-band signals with K frequency bands/bins, e.g. where K is larger than 10 or even larger than 20. K may be larger than 30.

In one or more example audio devices, the audio device comprises or is connected, e.g. by wire or wirelessly, to a first microphone for provision of the first microphone input signal.

In one or more example audio devices, the audio device comprises or is connected, e.g. by wire or wirelessly, to a second microphone for provision of the second microphone input signal.

In one or more example audio devices, the audio device comprises or is connected, e.g. by wire or wirelessly, to a loudspeaker also denoted receiver for output of the output audio signal.

In one or more example audio devices, the interface comprises a wireless transceiver also denoted radio transceiver and an antenna for wireless transmission of the output audio signal. The audio device may be configured for wireless communication with one or more devices, such as with another audio device and/or with one or more accessory devices, such as one or more of a smartphone, a tablet computer and/or a smart watch. The audio device optionally comprises an antenna for converting one or more wireless input audio signals to antenna output signal(s). The wireless input audio signal(s) may origin from one or more accessory devices, such as one or more of a smartphone, a tablet computer and/or a smart watch.

In one or more example audio devices, the interface comprises a connector for wired output of the output audio signal via the connector.

The one or more interfaces can be wireless interfaces, such as transmitters and/or receivers, and/or wired interfaces, such as connectors for physical coupling. For example, the audio device may have an input interface configured to receive data, such as microphone input signals. The audio device may have an output interface configured to transmit data, such as data representative of the output audio signal.

Advantageously, the disclosed audio devices can be used for all form factors in all types of environments, such as for headsets. For example, the audio device may not have a specific microphone placement requirement. The audio device can utilize an adaptation ability to output high quality speech and intelligibility.

For example, certain implementations of audio devices disclosed herein can use beamforming that can be optimized for passing speech through while cancelling noise. The beamforming may comprise a first beamforming, e.g. of a first microphone input signal and a second microphone input signal, for provision of a first beamforming output signal. The beamforming may comprise a second beamforming, e.g. of a first microphone input signal and a second microphone input signal, for provision of a second beamforming output signal. The first beamforming may be a speech beamforming. In other words, the first beamforming may be configured or determined to increase a relative amount of speech of a main speaker, such as a user of the audio device, in the first beamforming output signal. The second beamforming may be a noise beamforming. In other words, the second beamforming may be configured or determined to decrease a relative amount of speech of the main speaker or user in the second beamforming output signal. The second beamforming may be configured or determined to increase a relative amount of noise in the second beamforming output signal.

Moreover, a second beamforming can be optimized for passing noise through while cancelling the main speaker. The beamforming for speech may be, for example in the signal path from the first and second microphone input signals to the output audio signal. The beamforming for noise may, for example, only be used as information for further suppression of noise and other disturbances in the signal path to the output audio signal.

One or more example audio devices uses beamforming comprising the first beamforming and the second beamforming.

Moreover, certain implementations of audio devices disclosed herein may use one or more attenuators, such as specialized attenuators for outputting high quality speech and intelligibility. For example, a distractor attenuator optionally also denoted primary attenuator can be optimized for attenuating directional sound sources in the somewhat near field, e.g. coming from the front half plane relative to the direction the user is facing.

The distractor attenuator can be configured to open for main speech and block speech from distractors, such as other speakers than the main speaker, e.g. in the front half plane. A static noise attenuator optionally also denoted secondary attenuator or tertiary attenuator can reduce the static noise in the signal, while passing non-static noise in the signal through.

In one or more example audio devices, the audio device can advantageously improve an amount of speech that is heard by a user. This can be performed via one or more processes discussed below. For example, the audio device can be configured to increase a relative amount of speech in the output audio signal. The audio device can be configured to decrease, such as attenuate and/or suppress, a relative amount of noise. The audio device can be configured to increase one or more of speech intelligibility and listening comfort.

In one or more example audio devices, the audio device, such as the processor, may include a controller. One or more of the modules and/or functionalities discussed with respect to the example disclosed audio devices can be optimized, controlled, changed, and/or modified, for example through the use of one or more controllers. The controller can be configured to send control signals. The controller can be configured to receive respective module signals.

In one or more example audio devices, the audio device, such as the processor, can include a feature extractor. The feature extractor can be configured to determine one or more features of a particular signal, such as, for example, one or more of a first microphone signal, a second microphone signal, a first microphone input signal, a second microphone input signal, a first beamforming output signal, a second beamforming output signal. The one or more features can include, for example, one or more of: signal amplitude, signal energy, signal directionality, signal dynamic range, signal frequencies, signal modulation, of one or more signals, for the entire audible frequency range and/or for one or more frequency bands. The one or more features can be based on a determination of, for example, signal content in one or more signals, such as main speech, distractor speech and/or noise. The feature extractor may be a part of the controller. The controller may be separate from the feature extractor. The controller may be in communication with the feature extractor.

In one or more example audio devices, the audio device, such as the processor, can include or implement one or more modules. The modules can, for example, include a number of components such as electronics, mechanics, etc. in order to perform one or more particular actions or operations. The modules may be physical modules. The modules may be electronic modules. The modules may be computational modules and/or software modules.

The modules may be configured to communicate with one another. Communication can occur through wired and/or wireless communication.

The audio device may have further modules and/or components not discussed herein, and the disclosure is not so limited.

In one or more example audio devices, the audio device can include one or more memories. A memory can be configured to store one or more of criteria, signals, schemes, parameters, coefficients, gains matrices, etc. The memory may be utilized by one or more modules of the audio device discussed herein. One or more modules discussed herein can utilize the memory for storage and/or retrieving of data. One or more modules discussed herein can be a portion of the memory.

In one or more example audio devices, the audio device can include one or more processors. The processor can be configured to execute any of the operations discussed herein. One or more modules discussed herein can utilize the processor for operating. One or more modules discussed herein can be a portion of the processor. The processor may be a distributed processor.

The processor can be configured to obtain, such as receive and/or determine, a first microphone input signal. The processor can be configured to obtain, such as receive and/or determine, a second microphone input signal. The processor can be configured to obtain, such as receive and/or determine, a first microphone input signal and a second microphone input signal.

In one or more example audio devices, the audio device may include a first microphone and/or a second microphone. The audio device may include more than two microphones. The audio device may not include a first microphone and/or a second microphone, but may receive signals from the first microphone and the second microphone.

The first microphone input signal may be associated with a first microphone. The second microphone input signal may be associated with a second microphone. The second microphone input signal may be associated with the first microphone. In other words, the first microphone input signal may be based on a first microphone signal from the first microphone and/or the second microphone input signal may be based on a second microphone signal from the second microphone.

The first microphone and the second microphone may be located on a same side, e.g. at, on, or in the same ear, of a user. The first microphone and the second microphone may be located on different sides of a user. The first microphone and/or the second microphone may be arranged on a microphone boom of the audio device. The first microphone and the second microphone may be directed in the same direction. The first microphone and the second microphone may be directed in different directions. For example, the first microphone may be forward facing, and the second microphone may be backward facing. The first microphone may be directed at an opposite direction as the second microphone. The first microphone may be arranged to be closer to the user's mouth than the second microphone during use of the audio device.

The first microphone and/or the second microphone may be configured to receive a first external sound or audio input and a second external sound or audio input, respectively. The first audio input and the second audio input may undergo certain processes, such as filtering, amplification, digitalization, converting, etc. For example, the first external sound can be converted into a first microphone signal by the first microphone. The second external sound can be converted into a second microphone signal by the second microphone. The first microphone signal may be pre-processed for provision of the first microphone input signal. The second microphone signal may be pre-processed for provision of the second microphone input signal.

In one or more example audio devices, the processor can be configured to process the first microphone input signal. The processor can be configured to process the second microphone input signal. The processor can be configured to process a first microphone input signal and a second microphone input signal. For example, the processor can process by one or more of: filtering, transforming, beamforming, noise suppressing, attenuating, speech enhancement, hearing loss compensation, amplitude compression, and adjusting gain.

The processor can be configured to output the output audio signal. For example, the processor can be configured to transmit the output audio signal. The processor can be configured to transmit the output audio signal wirelessly. The processor can be configured to transmit the output audio signal via a wired connection/connector. The audio device can be configured to transmit the output audio signal as an audible signal for a user to hear.

In one or more example audio devices, the audio device may include an input module. The input module may include the first microphone and the second microphone. The input module may be configured to receive microphone signals from the first microphone and the second microphone. The input module can be configured to apply certain processing to audio received by the first microphone and the second microphone. For example, the input module may be configured to transform microphone signals from analog-to-digital and/or from time-domain to frequency domain. The input module can be configured to apply a fast Fourier transformation. The input module may include one or more AD converters and one or more filters, such as one or more filter banks and/or one or more transient noise suppressors.

In one or more example audio devices, the input module may be configured to output, such as transmit, a first microphone signal and a second microphone signal.

The input module may be configured to output input signals. The input module can output the input signals to the feature extractor and/or the controller. The input module can be configured to receive, such as obtain, control signals from the controller. The control signals can be configured to control one or more operations of the input module. In one or more example audio devices, the audio device may not include an input module.

In one or more example audio devices, the audio device may include a pre-processor module. The pre-processor module may be integrated in the processor. The pre-processor module may be configured to obtain, such as receive, the first microphone signal and the second microphone signal. Alternatively, or in conjunction, the pre-processor module may be configured to obtain, such as receive, signals from the first microphone and/or the second microphone, thereby bypassing the input module.

The pre-processor module may be configured to perform processing on the first microphone signal and the second microphone signal. The pre-processor module can be configured to output the first microphone input signal and/or the second microphone input signal. In one or more example audio devices, the first microphone signal and the second microphone signal are used as the first microphone input signal and the second microphone input signal, respectively.

The pre-processor module may include, for example, a microphone sensitivity compensator. The pre-processor module may be configured to use and/or apply one or more test compensation schemes and/or beamformers in order to compensate, such as one or more of modify, adjust, and attenuate, the first microphone signal and/or the second microphone signal, e.g. for provision of the first microphone input signal and the second microphone input signal. In other words, the pre-processor module may be denoted a compensator configured to compensate one or both of the first microphone signal and the second microphone signal.

The pre-processor module may be configured to output pre-processor signal(s), such as the first microphone input signal and/or the second microphone input signal, to the feature extractor and/or the controller. The pre-processor module can be configured to receive, such as obtain, control signals from the controller. The control signals can be configured to control one or more operations of the pre-processor module. In one or more example audio devices, the audio device may not include a pre-processor module.

In one or more example audio devices, the audio device may include a beamformer module. The beamformer module can be configured to apply beamforming. The beamformer module can be configured to obtain, such as receive, the first microphone input signal and the second microphone input signal. The beamformer module can be configured to apply beamforming to the first microphone input signal and the second microphone input signal. Alternatively, or in conjunction, the beamformer module may be configured to obtain, such as receive, the first microphone signal and/or the second microphone signal, thereby bypassing the pre-processor module. The beamformer module can be configured to apply beamforming to the first microphone signal and the second microphone signal. Alternatively, or in conjunction, the beamformer module may be configured to obtain, such as receive, signals from the first microphone and/or the second microphone, thereby bypassing the input module and the pre-processor module. The beamformer module can be configured to apply beamforming to the signals from the first microphone and/or the second microphone, thereby bypassing the input module and the pre-processor module. In one or more example audio devices, the beamformer module is configured to apply a first beamforming, e.g. of the first microphone input signal and the second microphone input signal, for provision of a first beamforming output signal and/or a second beamforming, e.g. of the first microphone input signal and the second microphone input signal, for provision of a second beamforming output signal. The first beamforming may be a speech beamforming. In other words, the first beamforming may be configured or determined to increase a relative amount of speech of a user in the first beamforming output signal. The second beamforming may be a noise beamforming. In other words, the second beamforming may be configured or determined to decrease a relative amount of speech of the user in the second beamforming output signal. The second beamforming may be configured or determined to increase a relative amount of noise in the second beamforming output signal.

The beamformer module may apply beamforming based on one or more sets of parameters, such as based on a first set of covariance parameters and/or a second set of covariance parameters, in order to apply beamforming of the first microphone input signal and the second microphone input signal. In one or more example audio devices, the beamformer module may include a voice activity detector and/or a non-voice, such as a noise, activity detector.

The beamforming module may be configured to provide/output a first beamforming output signal and/or a second beamforming output signal. The output audio signal may be based on the first beamforming output signal and/or the second beamforming output signal.

The beamformer module can output the first beamforming output signal and/or the second beamforming output signal to the feature extractor and/or the controller. The beamformer module can be configured to receive, such as obtain, control signals from the controller. The control signals can be configured to control one or more operations of the beamformer module. In one or more example audio devices, the audio device may not include a beamformer module.

In one or more example audio devices, the audio device may include a suppressor module. The suppressor module may include one or more suppressors. The one or more suppressors may be configured to suppress, such as attenuate, reduce, modify, signals received by the suppressor module.

In one or more example audio devices, the suppressor module may obtain, such as receive, one or more features associated with the first microphone input signal and/or the second microphone input signal. Alternatively, or in conjunction, the suppressor module may be configured to obtain, such as receive, one or more features associated with the first microphone signal and/or the second microphone signal, thereby bypassing the pre-processor module. Alternatively, or in conjunction, the suppressor module may be configured to obtain, such as receive, one or more features associated with the first beamforming output signal and/or the second beamforming output signal. Alternatively, or in conjunction, the suppressor module may be configured to obtain, such as receive, one or more features associated with the signals received from the first microphone and/or the second microphone.

The suppressor module may be configured to determine a noise suppression scheme. The suppressor module may be configured to apply the noise suppression scheme. For example, the suppressor module may be configured to apply the noise suppression scheme to the first beamforming output signal and/or the second beamforming output signal. The suppressor module may be configured to apply the noise suppression scheme to the first microphone input signal and the second microphone input signal. The suppressor module may be configured to apply the noise suppression scheme to the first microphone signal and the second microphone signal.

The suppressor module can output the suppressor signals to the feature extractor and/or the controller. The suppressor module can be configured to receive, such as obtain, control signals from the controller. The control signals can be configured to control one or more operations of the suppressor module. In one or more example audio devices, the audio device may not include a suppressor module.

In one or more example audio devices, the audio device may include a combiner module. The combiner module may be a part of the suppressor module. The combiner module may be separate from the suppressor module.

The combiner module can be configured to combine different signals. In one or more example audio devices, the combiner module is configured to combine, such as mix, add, subtract, a beamforming output signal, such as the first beamforming output signal and a suppressor output signal from the suppressor module. The combiner module can be configured to apply one or more schemes to signals. For example, the combiner module can be configured to obtain, or receive, the noise suppression scheme from the suppressor module and apply the suppression scheme to the first beamforming output signal.

The combiner module can be configured to obtain, such as receive, the first beamforming output signal and/or the second beamforming output signal. Alternatively, the combiner module can be configured to obtain, such as receive, the first microphone input signal and/or the second microphone input signal. Alternatively, the combiner module can be configured to obtain, such as receive, the first microphone signal and/or the second microphone signal. Alternatively, the combiner module can be configured to obtain, such as receive, signals from the first microphone and/or the second microphone.

The combiner module can output combiner signals to the feature extractor and/or the controller. The combiner module can be configured to receive, such as obtain, control signals from the controller. The control signals can be configured to control one or more operations of the combiner module. In one or more example audio devices, the audio device may not include a combiner module.

In one or more example audio devices, the audio device may include an output module. The output module can be configured to receive, such as obtain, the combined signal from the combiner module. The output module may be configured to apply inverse Fourier transform, such as inverse FFT. In other words, the output module may be configured to transform an input signal from the frequency domain to the time domain. The output module may include one or more DA converters and one or more adders. The output module can perform processing on the combined signal. For example, the output module can apply finite impulse response (FIR) filtering and/or infinite impulse response (IIR) filtering on the combined signal. The output module can be configured to output the output audio signal. The output module may include one or more of a transceiver, a loudspeaker, and a connector. The output module may be configured to modify the combined signal into a signal that can be heard by a user, for example an output sound signal. The output module may be configured to output the output audio signal to a separate device, such as a speaker or a microphone. The output sound signal may, for example, provide a sidetone signal to a user of the audio device.

The output module can provide/output output signal(s) to the feature extractor and/or the controller. The output module can be configured to receive, such as obtain, control signals from the controller. The control signals can be configured to control one or more operations of the output module.

In one or more example audio devices, the audio device may contain all of the modules discussed above. In one or more example audio devices, the audio device may include one or more of an input module, a pre-processor module, a beamformer module, a suppressor module, a combiner module, and an output module. In one or more example audio devices, the audio device includes an input module, a pre-processor module, a beamformer module, a suppressor module, a combiner module, and an output module as described herein.

In one or more example audio devices, the audio device may not include an output module.

In one or more example audio devices, to obtain the first microphone input signal and the second microphone input signal comprises to, e.g. in pre-processor module, obtain a first microphone signal and a second microphone signal, e.g. from an input module of the audio device/processor; determine a gain compensation scheme, e.g. based on the first microphone signal and/or the second microphone signal; and compensate a gain of one or both of the first microphone signal and the second microphone signal in accordance with the gain compensation scheme for provision of the first microphone input signal and the second microphone input signal.

In one or more example audio devices, to determine the gain compensation scheme optionally comprises to apply a plurality of, such as in the range from 3 to 20, test compensation schemes to the first microphone signal and/or the second microphone signal; determine a performance parameter for each or at least a plurality of the test compensation schemes; and select the gain compensation scheme based on the performance parameters.

In one or more example audio devices, determining the gain compensation scheme can be paused and/or slowed down. For example, it may be paused and/or slowed down in accordance with detecting stable conditions. Stable conditions can include, for example, repetitively selecting the same gain compensation scheme over a predefined time period. In one or more example audio devices, determining the gain compensation scheme can be resumed and/or sped up. For example, it may be resumed and/or sped up in accordance with detecting unstable conditions. Unstable conditions can be, for example, changing the selected gain compensation scheme and/or detecting other sound than speech and/or detecting speech again after a period without speech. By providing an adaptive determination of the gain compensation scheme power consumption is reduced in turn providing a power efficient audio device.

A plurality of test compensation schemes can be applied. The test compensation schemes may include, for example, attenuation, changes, modifications, filtering, etc. The particular number of test compensation schemes to be applied is not limiting. For example, 2, 3, 4, 5, 6, 7, 8, 9, 10, 15, 20, 25, 30, 35, or 40 test compensation schemes can be applied. The number of test compensation schemes applied can vary. The test compensation schemes can be various types of schemes. They can be, for example, stored in the memory. Alternatively, the test compensation schemes can be obtained from a different device.

The influence of microphone characteristics and microphone tolerances on beamforming can be a factor in obtaining a robust and/or desired output. For example, a cheap or bad microphone can severely compromise the output in a speech enhancement algorithm.

Accordingly, as discussed herein, examples of the disclosed audio device can use mirrored beamforming to improve the output audio signal. For example as outlined above, the audio device can test a range of sensitivities and determine which one performs the best, for example based on the plurality of test compensation schemes. This can be performed rather than, or in conjunction with, trying to estimate the sensitivity, which may be power intensive and require longer setting times. Thus, the present disclosure provides improved, such as fastly adapting and/or power efficient, microphone sensitivity compensation.

For example, the audio device may be configured to adjust microphone sensitivities between two microphones, such as through the first microphone signal and the second microphone signal, based on speech by selecting a gain compensation scheme. This may provide a better sensitivity match than being based on noise, such as non-speech. Further, the disclosure can provide for better matching during speech, which is a very fast process that can enable quick adjustments to changed conditions.

The sensitivity tolerance allowed in the audio device may be, for example, approximately ±0.1 dB, ±0.3 dB, ±0.6 dB, ±1 dB, ±2 dB, ±3 dB, ±4 dB, ±5 dB, ±6 dB, ±7 dB, ±8 dB, ±9 dB, or ±10 dB. The particular sensitivity tolerance is not limiting.

In one or more example audio devices, to apply a plurality of test compensation schemes comprises to determine or retrieve, for each test compensation scheme, a gain setting; and apply the gain setting to the first microphone signal and the second microphone signal for provision of a first microphone test signal and a second microphone test signal. The performance parameter is optionally based on the first microphone test signal and the second microphone test signal.

For example, applying a test compensation scheme can provide one or more microphone test signals, such as a first microphone test signal and a second microphone test signal. The gain setting may affect gain of one or both of the first microphone signal and the second microphone signal. The gain setting may affect gain one or both of the first microphone input signal and the second microphone input signal. The gain setting may affect gain one or both of the first microphone test signal and the second microphone test signal.

In one or more example audio devices, applying the gain setting can be part of a first test beamforming and/or a second test beamforming.

The performance parameter for a test compensation scheme is optionally indicative of how effective the test compensation scheme is in providing a speech signal. In other words, the performance parameter for a test compensation scheme may be seen as a speech quality indicator.

For example, to determine the gain compensation scheme may comprise to apply test compensation schemes TCS_n, n=1, 2, . . . , N, where n is an index and N is the number of test compensation schemes, to the first microphone signal and/or the second microphone signal, each test compensation scheme TCS_n optionally defining a gain setting GS_n. A gain setting GS_n may comprise or define gains g_1_*n*, g_2_*n* applied to the first microphone signal and the second microphone signal, respectively and/or a gain difference gd_n between the gains g_1_*n*, g_2_*n* applied to the first microphone signal and the second microphone signal, respectively. The number N of test compensation schemes may be in the range from 3 to 20, such as in the range from 4 to 10. In other words, a first microphone test signal MTS_1_*n* and a second microphone test signal MTS_2_*n* may be given as:

$$MTS\_1\_n = g\_1\_n \cdot MS\_1 \text{ and}$$

$$MTS\_2\_n = g\_2\_n \cdot MS\_2,$$

where MS_1 is the first microphone signal and MS_2 is the second microphone signal.

A gain setting may define one or more first gains, such as a first broadband gain g_1_*n* or frequency-dependent first gains, for the first microphone input signal.

A gain setting may define one or more second gains, such as a second broadband gain g_2_*n* or frequency-dependent second gains, for the second microphone input signal.

Examples of different gain settings of respective test compensation settings in determining compensation settings are outlined in Table 1 below, where g_1_*n* and g_2_*n* are broadband gains applied to first microphone signal and second microphone signal, respectively, in the n'th test compensation scheme TCS_n.

TABLE 1

Example gain settings in test setting configurations A and B.

| TCS_n, n = 1, 2, . . . , 7 | A | B |
|---|---|---|
| TCS_1: (g_1_1, g_2_1) | (−1.5 dB, 1.5 dB) | (−0.5 dB, 0.5 dB) |
| TCS_2: (g_1_2, g_2_2) | (−1 dB, 1 dB) | (−.25 dB, 0.25 dB) |
| TCS_3: (g_1_3, g_2_3) | (−0.5 dB, 0.5 dB) | (0 dB, 0 dB) |
| TCS_4: (g_1_4, g_2_4) | (0 dB, 0 dB) | (0.25 dB, −0.25 dB) |
| TCS_5: (g_1_5, g_2_5) | (0.5 dB, −0.5 dB) | (0.5 dB, −0.5 dB) |
| TCS_6: (g_1_6, g_2_6) | (1.0 dB, −1.0 dB) | N/A |
| TCS_7: (g_1_7, g_2_7) | (1.5 dB, −1.5 dB) | N/A |

In one or more exemplary audio devices, a performance parameter PP_n of a respective test compensation scheme TCS_n is based on MTS_1_*n* and MTS_2_*n*.

In one or more example audio devices, to apply a plurality of test compensation schemes comprises to apply, for each test compensation scheme, a first test beamforming to the first microphone test signal and the second microphone test signal for provision of a first test beamforming output; and/or apply, for each test compensation scheme, a second test beamforming to the first microphone test signal and the second microphone test signal for provision of a second test beamforming output. The performance parameter PP_n is optionally based on the first test beamforming output and/or the second test beamforming output.

In other words, a first test beamforming output TBO_1_*n* of a test compensation scheme TCS_n may be given as:

$$TBO\_1\_n = TBF\_1(MTS\_1\_n, MTS\_2\_n),$$

where TBF_1 is a first test beamforming. The first test beamforming may be fixed or adaptive, e.g. in order to compensate for changes in microphone positions. The first test beamforming may have a first directionality being a first order directionality, such as a cardioid directionality, e.g. configured to increase a relative amount of speech in the first test beamforming output.

A second test beamforming output TBO_2_*n* of a test compensation scheme TCS_n may be given as:

$$TBO\_2\_n = TBF\_2(MTS\_1\_n, MTS\_2\_n),$$

where TBF_2 is a second test beamforming. The second test beamforming may be fixed or adaptive, e.g. in order to compensate for changes in microphone positions. The second test beamforming may have a second directionality being a first order directionality, such as a cardioid directionality, e.g. configured to decrease a relative amount of speech in the second test beamforming output.

Other order directionalities can be used as well for the first test beamforming and/or the second test beamforming, such as second and third order directionalities, and the particular directionality is not limiting. Further, other directionalities can be used for the first test beamforming and/or the second test beamforming. The particular directionality is not limiting.

In one or more example audio devices, the second test beamforming is spatially opposite the first test beamforming.

In one or more example audio devices, the performance parameter of each test compensation scheme is based on the first test beamforming output and the second test beamforming output, such as a ratio between the first test beamforming output and the second test beamforming output. The ratio can be weighted. The ratio may not be weighted. The ratio may be based on magnitudes of the first test beamforming output and the second test beamforming output. The ratio may be based on directionality of the first test beamforming output and the second test beamforming output. The ratio may be based on magnitudes and directionalities of the first test beamforming output and the second test beamforming output.

In other words, performance parameters PP_n for respective test compensation schemes TCS_n may be given as:

$$PP\_n=TBO\_1\_n/TBO\_2\_n.$$

In one or more example audio devices, the performance parameter of each test compensation scheme is based on a difference between the first test beamforming output and the second test beamforming output. The difference can be weighted. The difference may not be weighted. The difference may be based on magnitudes of the first test beamforming output and the second test beamforming output. The difference may be based on directionality of the first test beamforming output and the second test beamforming output. The difference may be based on magnitudes and directionalities of the first test beamforming output and the second test beamforming output.

In other words, performance parameters PP_n for respective test compensation schemes TCS_n may be given as:

$$PP\_n=TBO\_1\_n-TBO\_2\_n.$$

In one or more example audio devices, to select the gain compensation scheme comprises to select a test compensation scheme, i.e. the gain setting, of the plurality of test compensation schemes having a maximum or minimum performance parameter of the performance parameters. The maximum performance parameter may be indicative of the test compensation scheme providing the most optimized results.

In one or more example audio devices, the processor comprises a voice activity detector configured to detect presence of voice activity based on the first microphone signal and the second microphone signal, such as based on first test beamforming output and/or the second test beamforming output. In one or more example audio devices, the voice activity detector configured to detect presence of voice activity based on the first microphone input signal and/or the second microphone input signal. To determine the compensation scheme is optionally performed in accordance with a detection of presence of voice activity. For example, the audio device may trigger or perform gain compensation scheme selection in accordance with a detection of presence of voice activity with the voice activity detector. This may lead to more accurate or improved compensation scheme determination.

The voice activity detector can be a part of the audio device. The voice activity detector can be separate from the audio device. For example, the compensation scheme can be modified, such as changed or selected, by the processor based on a detection of the presence of voice activity.

In one or more example audio devices, the processor comprises a noise detector configured to detect presence of noise based on the first microphone input signal and the second microphone input signal. To determine the compensation scheme is optionally paused by the processor in accordance with a detection of presence of noise by the processor, such as by the feature extractor.

In one or more example audio devices, to obtain a first microphone signal comprises to obtain one or more, such as a plurality, e.g. 3, 4, 5, or more, first narrow-band signals each covering a respective frequency band of the first microphone signal. To obtain a second microphone signal may comprise to obtain one or more, such as a plurality, e.g. 3, 4, 5, or more, second narrow-band signals each covering a respective frequency band of the second microphone signal. To determine a gain compensation scheme may comprise to determine the gain compensation scheme based on the one or more first narrow-band signals and the one or more second narrow-band signals. To determine a gain compensation scheme may comprise to determine the gain compensation scheme based on M first narrow-band signals and M second narrow-band signals. M may be in the range from 2 to 8, such as 3, 4, 5, 6, 7.

In one or more example audio devices, to determine a gain compensation scheme is based on first microphone signal and second microphone signal in 2 to 8, such as 4, frequency bands/bins. The frequency bands/bins may span a frequency range with a total bandwidth in the range from 300 to 1 kHz. The frequency bands/bins may be arranged in the frequency range from 500 Hz to 1.5 kHz.

In one or more example audio devices, to compensate a gain of one or both of the first microphone signal and the second microphone signal comprises to compensate the gain of one or both of the first microphone signal and the second microphone signal at signal frequencies outside, such as above and/or below, the respective frequency bands of the one or more first narrow-band signals and the one or more second narrow-band signals. For example, to compensate a gain of the first microphone signal and/or the second microphone signal may comprise to compensate in one or more frequency bands below 500 Hz and/or above 1.5 kHz. In one or more example audio devices, to compensate a gain of the first microphone signal and/or the second microphone signal may comprise to apply a broadband gain to the first microphone signal and/or the second microphone signal. In one or more example audio devices, to compensate a gain of the first microphone signal and/or the second microphone signal may comprise applying a frequency-dependent gain to the first microphone signal and/or the second microphone signal.

In one or more example audio devices, to process the first microphone input signal and the second microphone input signal comprises to, e.g. with a beamforming module, determine a first set of covariance parameters based on the first microphone input signal and the second microphone input signal; determine a second set of covariance parameters based on the first microphone input signal and the second microphone input signal; determine a first beamforming based on the first set of covariance parameters and the second set of covariance parameters; and apply the first beamforming to the first microphone input signal and the second microphone input signal for provision of a first beamforming output signal. To process the first microphone input signal and the second microphone input signal may comprise to, e.g. with a beamforming module, determine a second beamforming based on the first set of covariance parameters and the second set of covariance parameters; and apply the second beamforming to the first microphone input signal and the second microphone input signal for provision of a second beamforming output signal. To provide the output audio signal may be based on the first beamforming output signal and/or the second beamforming output signal. The first beamforming is optionally determined to increase a relative amount of speech of a user in the first beamforming output signal, and the second beamforming is optionally determined to decrease a relative amount of speech of the user in the second beamforming output signal.

The first set of covariance parameters may be a set of speech covariance parameters. The first set of covariance parameters may be elements of a first covariance matrix. The first set of covariance parameters may enable computation of a first covariance matrix, such as based on the first microphone input signal and the second microphone input signal. The particular number of parameters in the first set of covariance parameters is not limiting. For example, the first set of covariance parameters could include 1, 2, 3, 4, 5, 10, 15, 20, 25, or 30 parameters.

The second set of covariance parameters may be a set of noise covariance parameters. The second set of covariance parameters may be elements of a second covariance matrix. The second set of covariance parameters may enable computation of a second covariance matrix, such as based on the first microphone input signal and the second microphone input signal. The particular number of parameters in the second set of covariance parameters is not limiting. For example, the second set of covariance parameters could include 1, 2, 3, 4, 5, 10, 15, 20, 25, or 30 parameters.

The first set of covariance parameters and the second set of covariance parameters may be the only covariance parameters in the audio device. The first covariance matrix and the second covariance matrix may be the only matrices in the audio device. In certain implementations, four total sets of covariance parameters and/or matrices are needed. Advantageously, the disclosed audio device can use only two sets of covariance parameters and/or matrices.

As mentioned, the processor is configured to determine a first beamforming. The first beamforming can be based on the first set of covariance parameters and the second set of covariance parameters. Similarly, the processor is configured to determine a second beamforming which is also based on the first set of covariance parameters and the second set of covariance parameters. Thus, the first beamforming and the second beamforming are both based on the first set of covariance parameters and the second set of covariance parameters. For example, the first beamforming and the second beamforming can be based on the same covariance parameters.

In one or more example audio devices, the processor is configured to, e.g. in accordance with a first update criterion being satisfied, update the first set of covariance parameters based on voice presence control signal received from a voice activity detector. In one or more example audio devices, the processor is configured to, e.g. in accordance with the first update criterion being satisfied, update the second set of covariance parameters based on voice presence control signal received from a voice activity detector.

The first update criterion can be based on a first update threshold. The first update criterion can be a criterion. Satisfying the first update criteria can include a specific signal being below the first update threshold. Satisfying the first update criteria can include a specific signal being above the first update threshold. Satisfying the first update criteria can include a specific signal being at the first update threshold. One of the first set of covariance parameters can be updated. A plurality of the first set of covariance parameters can be updated. All of the first set of covariance parameters can be updated.

In one or more example audio devices, the processor is configured to, in accordance with a second update criterion being satisfied, update the second set of covariance parameters based on non-voice presence control signal received from a non-voice activity detector. The second update criterion may be satisfied if the non-voice presence control signal is indicative of non-voice presence, i.e. that no voice is present.

The non-voice activity detector may be a part of the audio device. The non-voice activity detector may be separate from the audio device.

The second update criterion can be based on a second update threshold. The second update criterion can be a criterion. Satisfying the second update criteria can include a specific signal being below the second update threshold. Satisfying the second update criteria can include a specific signal being above the second update threshold. Satisfying the second update criteria can include a specific signal being at the second update threshold. One of the second set of covariance parameters can be updated. A plurality of the second set of covariance parameters can be updated. All of the second set of covariance parameters can be updated.

The voice activity detector may be a functional inversion of the non-voice activity detector or vice versa. The voice activity detector may determine opposite data from the non-voice activity detector. Non-voice presence control signal may be inverted data as compared to voice presence control signal.

The audio device may further include prioritization of voice presence control signal and non-voice presence control signal. For example, voice presence control signal may be prioritized over non-voice presence control signal. The voice presence control signal and the non-voice presence control signal may be weighted.

For example, when speech, such as voice presence control signal, is occurring, the first set of covariance parameters can be updated by the processor. Optionally, the second set of covariance parameters can be updated by the processor as well. When noise is occurring, such as non-voice presence control signal, the second set of covariance parameters can be updated by the processor. Optionally, the first set of covariance parameters can be updated by the processor as well. When there is a combination of noise and speech, the first set of covariance parameters and the second set of covariance parameters can be updated by the processor.

In one or more example audio devices, the first beamforming and/or the second beamforming are implemented as generalized eigenvalue beamforming e.g. using blind analytical normalization. A generalized eigenvalue may be a vector. The vector may satisfy one or more eigenvalue criterion. The generalized eigenvalue can be a vector of a matrix. Generalized eigenvalues can be applied by the processor to the first beamforming and/or to the second beamforming. Other types of eigenvalues can be used by the processor as well.

In one or more example audio devices, the processor is configured to determine a forgetting parameter based on the first microphone input signal and the second microphone input signal. The processor can be configured to determine a plurality of forgetting parameters. The forgetting parameter can be indicative of forgetting, such as ignoring, removing, deleting, certain data. The forgetting parameter can be based on ambient noise. The forgetting parameter may be based on an estimate of ambient noise. The forgetting parameter may be indicative of data to forget, such as not take action on. The forgetting parameter may be indicative of data indicative of passing through. The forgetting parameter may be updated. The forgetting parameter may be a plurality of forgetting parameters.

One way to estimate voice presence control signal and non-voice presence control signal is to assume access to individual voice and non-voice signals and recursively estimate these statistics based on the history and present state of the input signals. A forgetting parameter can be used as well. Usually, it is a common practice to use a fixed number close to 1 for both the voice and non-voice signal. However, there is a drawback in this approach, as one specific forgetting parameter may not fit all cases. For example, it may be better to forget relatively fast when there's one or few loud moving distractors. Whereas when the sound environment is more fixed, such as in a canteen with noise everywhere, it may be better to forget slower.

In one or more example audio devices, the processor/beamformer module is configured to update the first covariance parameters and/or the second covariance parameters based on the forgetting parameter. For example, the processor can be configured to update the first covariance parameters based on a first forgetting factor, such that when the first forgetting factor is high, the respective covariance parameters are adapted faster to changes in the first and/or second microphone inputs signals than when the first forgetting factor is low. The processor can be configured to update the second covariance parameters based on a second forgetting factor. The forgetting factor(s) can be useful for the processor to determine how fast to adapt the respective covariance parameters to changes in the first and/or second microphone inputs signals.

In one or more example audio devices, to apply the first beamforming comprises to maximize a signal-to-noise ratio of speech from a main speaker and/or to apply the second beamforming comprises to maximize a noise-to-signal ratio. The main speaker may be a user of the audio device. The main speaker may be a speaker different from the user of the audio device. The noise-to-signal ratio may be a general noise-to-signal ratio, not based on a particular speaker. The noise-to-signal ratio may be based on a particular speaker.

The first beamforming can be determined by the processor/beamformer module to increase and/or decrease a relative amount of speech of a user in the first beamforming output signal. The second beamforming may be determined by the processor to increase and/or decrease a relative amount of speech of the user in the second beamforming output signal.

In one or more example audio devices, the processor/beamformer module is configured to determine the first beamforming and/or to determine the second beamforming based on a common first set of covariance parameters and a common second set of covariance parameters. In other words, the first beamforming and the second beamforming are optionally determined based on the same covariance parameters.

In one or more example audio devices, the processor/beamformer module can be configured to determine the first beamforming and/or to determine the second beamforming based on a common set of covariance parameters based on the first set of covariance parameters and the second set of covariance parameters. The common set of covariance parameters may be a matrix. The common set of covariance parameters may allow for a determination of a matrix.

In one or more example audio devices, the processor/beamformer module can be configured to determine the first beamforming based on a common first set of covariance parameters and a common second set of covariance parameters. In one or more example audio devices, the processor can be configured to determine the second beamforming based on a common first set of covariance parameters and a common second set of covariance parameters.

In one or more example audio devices, the processor, such as the controller, comprises a feature extractor for provision of features associated with signals in the audio device. The processor may comprise a controller configured to control the first beamforming and/or the second beamforming based on one or more features, e.g. from the feature extractor.

The controller can be part of the feature extractor. The feature extractor can be separate from the controller. The feature extractor can be in communication with the control. The controller can be configured to control via providing data to a processor.

The one or more features can be any features associated with signals in the audio device, such as with one or more of: the first microphone signal, the second microphone signal, the first microphone input signal, the second microphone input signal, the first microphone test signal, the second microphone test signal, the combined signal, and the output audio signal.

In one or more example audio devices, the feature extractor is configured to determine one or more first input features associated with the first microphone input signal. The controller may be configured to control the beamforming, such as the first beamforming and/or the second beamforming, based on one or more features of the first input features.

The one or more first input features may comprise a first primary input feature, such as speech signal amplitude, speech signal power, speech signal frequencies and/or frequency distribution, speech signal modulation index, noise signal amplitude, noise signal power, noise signal frequencies and/or frequency distribution, noise signal modulation index.

In one or more example audio devices, the feature extractor is configured to determine one or more second input features associated with the second microphone input signal. The controller may be configured to control the beamforming, such as the first beamforming and/or the second beamforming, based on one or more features of the second input features. The one or more second input features may comprise a second primary input feature, such as speech signal amplitude, speech signal power, speech signal spectrum, speech signal frequencies and/or frequency distribution, speech signal modulation index, noise signal amplitude, noise signal power, noise signal spectrum, noise signal frequencies and/or frequency distribution, noise signal modulation index.

In one or more example audio devices, the feature extractor is configured to determine one or more common input features associated with the first microphone input signal and the second microphone input signal. The controller may be configured to control the first beamforming and/or the second beamforming based on one or more features of the common input features. The one or more common input features may comprise a first common input feature, such as speech signal amplitude, speech signal power, speech signal frequencies and/or frequency distribution, speech signal modulation index, noise signal amplitude, noise signal power, noise signal frequencies and/or frequency distribution, noise signal modulation index.

In one or more example audio devices, the feature extractor is configured to determine one or more first output features associated with the first beamforming output signal. The controller may be configured to control the beamforming, such as the first beamforming and/or the second beamforming, based on one or more features of the first output features. The one or more first output features may comprise a first primary output feature, such as speech signal amplitude, speech signal power, speech signal frequencies and/or frequency distribution, speech signal modulation index, noise signal amplitude, noise signal power, noise signal frequencies and/or frequency distribution, noise signal modulation index.

In one or more example audio devices, the feature extractor is configured to determine one or more second output features associated with the second beamforming output signal. The controller may be configured to control the first beamforming and/or the second beamforming based on one or more features of the second output features. The one or more second output features may comprise a second primary output feature, such as speech signal amplitude, speech signal power, speech signal frequencies and/or frequency distribution, speech signal modulation index, noise signal amplitude, noise signal power, noise signal frequencies and/or frequency distribution, noise signal modulation index.

In one or more example audio devices, the feature extractor is configured to determine one or more common output features associated with the first beamforming output signal and the second beamforming output signal. The controller may be configured to control the first beamforming and/or the second beamforming based on one or more features of the common output features. The one or more common output features may comprise a first common output feature, such as speech signal amplitude, speech signal power, speech signal frequencies and/or frequency distribution, speech signal modulation index, noise signal amplitude, noise signal power, noise signal frequencies and/or frequency distribution, noise signal modulation index.

The one or more features, such as the one or more first input features, the one or more second input features, the one or more common input features, the one or more first output features, and/or the one or more second output features, can be, for example, one or more of power, magnitude, directionality, noise, voice, sound levels, and distortion.

Advantageously, examples of the disclosed audio device can be configured to maximize the output signal-noise-ratio of arrays of microphones in a noisy environment. A voice activity detector can be used in certain examples, which can provide information to update signal statistics, such as in the first set of covariance parameters and the second set of covariance parameters. Further, examples of audio devices do not have "distortion-less" constraint, such as in minimum variance distortion-less response (MVDR), which under normal circumstances may not be as accurate for speech beamforming.

In one or more example audio devices, the disclosure can provide for more stable beamforming, such as via one or more beamformers, while also reducing computational loads as compared with independent beamformers.

The audio device can use the same information (covariance parameters) for both the speech beamformer (first beamformer) and noise beamformer (second beamformer) where not only the SNR (signal to noise ratio) is maximized for the main speaker but also the NSR (noise to signal ratio) is maximized. In other words, the respective beamforming can be optimized for passing noise through while cancelling speech and vice versa. This both saves computations and benefits stability as the first beamforming and the second beamforming may be synchronized across both time and frequency. Finally, the first beamforming output signal and/or the second beamforming output signal or features thereof can serve as robust input for ambient noise suppressor and/or the distractor attenuation.

In one or more example audio devices, to process the first microphone input signal and the second microphone input signal comprises to determine a first distractor indicator, e.g. based on one or more features associated with the first microphone input signal and/or the second microphone input signal; determine a first distractor attenuation parameter based on the first distractor indicator; optionally determine a second distractor indicator, e.g. based on one or more features associated with the first microphone input signal and/or the second microphone input signal; optionally determine a second distractor attenuation parameter based on the second distractor indicator; determine an attenuator gain based on the first distractor attenuation parameter and/or the second distractor attenuation parameter; and apply a noise suppression scheme to a first beamforming output signal, e.g. according to the attenuator gain for provision of the output audio signal.

The present disclosure provides that the audio device can be optimized for attenuating directional sound sources in the near field coming from the front half plane relative to the direction the audio device, or other microphone, user is facing. Advantageously, the audio device can open for main speech, such as user speech, and block the distractor from passing through. As discussed herein, the audio device can allow for distractor discrimination in lower frequency ranges by utilizing the fact that a distractor causes smaller level difference on the microphones compared to the main speaker. In the higher frequency ranges, the audio device can allow for distractor discrimination by utilizing the fact that the first beamformer picks up a head-on distractor better and/or louder than the main speaker relative to an omnidirectional microphone.

Moreover, the audio device optionally implements functionality that measures how much extra distractor attenuation is safe to apply. That may be based on beamformer efficiency (short term ratio between speech and noise beamformer magnitudes) and/or on an ambient noise estimate.

To determine a first distractor attenuation parameter DAP_1 based on the first distractor indicator DI_1 may comprise to map the first distractor indicator DI_1 to a first distractor attenuation parameter DAP_1 via a function or a look-up table. For example, an increased DI_1 may result in an increased DAP_1. A reduced DI_1 may result in a reduced DAP_1.

To determine a second distractor attenuation parameter DAP_2 based on the second distractor indicator DI_2 may comprise to map the second distractor indicator DI_2 to a second distractor attenuation parameter DAP_2 via a function or a look-up table. For example, an increased DI_2 may result in an increased DAP_2. A reduced DI_2 may result in a reduced DAP_2.

The audio device may add 5, 10, 15, 20, 25, 30, 35, 40, 45 dB of extra attenuation.

Determining the first distractor indicator and/or the second distractor indicator can be performed in an attenuator, for example a first attenuator or a distractor attenuator.

The first distractor indicator can be a low-frequency distractor indicator. For example, low-frequency can be in the range of 100 Hz to 1.500 Hz, such as 125 Hz to 1125 Hz, such as 150 Hz to 1.000 Hz. The particular range is not limiting. The first distractor indicator can be indicative of distractors in a low-frequency range. The low-frequency range can be particular advantageous for determining level differences between signals picked up respectively by microphones located at different distance from the user's mouth.

The first distractor indicator can be, for example, based on a ratio between a fixed beamformer configured to pick up a main speaker, and its conjugated and/or mirrored counterpart which is configured to attempt to cancel the main speaker.

In one or more example audio devices, to determine a first distractor indicator can include to determine a first distractor indicator based on one or more features, e.g. associated with the first microphone input signal and the second microphone input signal, in a low-frequency range. The low frequency range can be the range of 100 Hz to 1.500 Hz, such as 125 Hz to 1125 Hz., such as 150 Hz to 1.000 Hz.

The one or more features can be obtained from, for example, a feature extractor. The one or more features can be, for example, a magnitude and/or directionality of the first microphone input signal and the second microphone input signal. The one or more features can be, for example, a magnitude and/or directionality of the first beamforming output signal and/or the second beamforming output input signal.

In one or more example audio devices, the first distractor indicator can be based on a ratio between a feature being a first beamforming output signal magnitude, i.e. a first output feature, and a feature being a second beamforming output signal magnitude, i.e. a second output feature.

The first beamforming output signal magnitude and/or the second beamforming output signal magnitude may be, for example, the one or more features associated with the first microphone input signal and the second microphone input signal.

The second distractor indicator can be a high-frequency distractor indicator. For example, high-frequency can be larger than 5 kHz, such as in the range 5 kHz to 10 kHz, such as in the range of 5.5 kHz to 7 kHz. The particular frequency is not limiting. The second distractor indicator can be indicative of distractors in a high-frequency range.

In one or more example audio devices, to determine a second distractor indicator comprises to determine a second distractor indicator based on one or more features associated with the first microphone input signal and the second microphone input signal in a high-frequency range. The high-frequency range can be a frequency range from 5.5 kHz to 7 kHz.

The one or more features can be obtained from, for example, a feature extractor. The one or more features can be, for example, a magnitude and/or directionality of the first microphone input signal and the second microphone input signal.

In one or more example audio devices, the second distractor indicator can be based on a ratio. The ratio can be a ratio between a feature being a first beamforming output signal magnitude and a feature being an omni magnitude.

The omni-magnitude can be based on a single microphone input, such as the first microphone input signal or the second microphone input signal. The omni-magnitude can be based on a sum of two or more microphone inputs, for example, when the microphones are placed with respect to bilateral symmetry. The omni-magnitude may be a magnitude of one or more of the first microphone (input) signal and/or the second microphone (input) signal.

The first distractor indicator and/or the second distractor indicator can be based on one or more features associated with the first microphone input signal and the second microphone input signal. For example, the first distractor indicator and/or the second distractor indicator can be based on one or more features associated with the first microphone input signal and the second microphone input signal that indicate that one or more distractors are at a certain distance away from a microphone. This distance can be, for example, 40, 50, 60, 70, 80, 90, or 100 cm. This distance can be, for example, greater than 40, 50, 60, 70, 80, 90, or 100 cm.

The first distractor attenuation parameter also denoted DAP_1 may be indicative of a gain to be applied, e.g. for frequency bands below a low-frequency threshold. The first distractor attenuation parameter may be indicative of a low-frequency gain. The first distractor attenuation parameter may be indicative of frequency/band-specific gains. The first distractor attenuation parameter may be a scalar or a vector.

In one or more example audio device, to determine the first distractor attenuation parameter can include to determine whether a first limit criterion is satisfied, and in accordance with a determination that the first limit criterion is satisfied, optionally limit the first distractor attenuation parameter based on a first gain limit. To determine the first distractor attenuation parameter may comprise to, in accordance with a determination that the first limit criterion is not satisfied, not limit the first distractor attenuation parameter based on a first gain limit.

The first limit criterion may be satisfied if the first distractor attenuation parameter is above a first gain limit. The first limit criterion may be satisfied if the first distractor attenuation parameter is below the first gain limit.

The first gain limit may be indicative of a maximum amount of gain to be applied. For example, in certain situations gain may not be applied. In certain variations, attenuation may not be applied. For example, the first distractor attenuation parameter may be restricted from going above or below a certain value.

The first gain limit GL_1 may be used for limiting or decreasing the first distractor attenuation parameter DAP_1 such that the resulting attenuation is reduced with increasing ambient noise, e.g. based on the noise parameter as described herein. Limiting DAP_1 by a first limit criterion can be advantageous in avoiding the incorrect attenuation of low-frequency noise. For example, when a main speaker is talking, the processor may not attenuate low frequency bands which may inadvertently attenuate the main speaker. The first gain limit can be a function of a low frequency ambient noise estimate.

The second distractor attenuation parameter also denoted DAP_2 may be indicative of a gain to be applied, e.g. for frequency bands above a high-frequency threshold. The second distractor attenuation parameter may be indicative of a high-frequency gain. The second distractor attenuation parameter may be indicative of frequency/band-specific gains. The second distractor attenuation parameter may be a scalar or a vector.

In one or more example audio device, to determine the second distractor attenuation parameter can include to determine whether a second limit criterion is satisfied. In accordance with a determination that the second limit criterion is satisfied, the processor/noise suppressor module may limit the second distractor attenuation parameter DAP_2 based on a second gain limit GL_2. In accordance with a determination that the second limit criterion is not satisfied, the processor/noise suppressor module may not limit the second distractor attenuation parameter based on a second gain limit.

The second limit criterion may be satisfied when the second distractor attenuation parameter is above the second gain limit. The second limit criterion may be satisfied when the second distractor attenuation parameter is below the second gain limit.

The second gain limit GL_2 may be indicative of a maximum amount of gain to be applied in high-frequency bands. For example, in certain situations gain may not be applied. In certain variations, attenuation may not be applied. For example, the second distractor attenuation parameter may be restricted from going above or below a certain value.

High frequency distractor attenuation also denoted second gain compensation can work quite well even in high levels of ambient noise. It may result in too much attenuation in some reflection scenarios. Limiting attenuation in high frequencies, such as utilizing the second distractor attenuation parameter, can be based on an estimate of how well the beamformers are performing together, e.g. based on a beamformer performance parameter. For example, the beamformer performance parameter may be indicative of the magnitude ratio between the speech that the first beamforming output signal is picking up and the noise that the second beamforming output signal is picking up. This ratio can be affected by reflections.

In one or more example audio devices, to process the first microphone input signal and the second microphone input signal can include to determine a noise parameter. The noise parameter can be indicative of ambient noise. The noise parameter can be indicative of ambient noise based on the first microphone input signal and the second microphone input signal. To determine a first distractor attenuation parameter can be based on the first distractor indicator and the noise parameter.

Ambient noise can be noise that is not speech. Ambient noise can be noise that is not user speech. Ambient noise can be noise that is not speaker speech. For example, traffic noise, natural noise, and/or water noise can all be considered ambient noise. Detecting when there is no speech can be used for updating the noise parameter.

In one or more example audio devices, to determine a noise parameter can include to obtain one or more noise features. The noise features can be associated with the first microphone input signal. The noise features can be associated with the second microphone input signal. The noise features can be associated with the first microphone input signal and/or the second microphone input signal. The noise parameter can be based on one or more noise features of the first microphone input signal and/or the second microphone input signal. The noise parameter can be based on one or more noise features of the first microphone input signal. The noise parameter can be based on one or more noise features of the second microphone input signal. A noise feature can be associated with the first beamforming output signal. A noise feature can be associated with the second beamforming output signal. For example, the noise parameter may be based on a second primary output feature associated with the second beamforming output signal, wherein the second primary output feature is magnitude of the second beamforming output signal.

The noise feature may be obtained, for example, from a feature extractor of the audio device.

In one or more example audio devices, to process the first microphone input signal and the second microphone input signal can include to determine a first speech parameter. The first speech parameter can be indicative of non-speech. The first speech parameter can be indicative of non-speech based on the first microphone input signal and the second microphone input signal. To determine a noise parameter can be based on the first speech parameter. For example, to determine a noise parameter may comprise to update the noise parameter in accordance with the first speech parameter being indicative of non-speech. In other words, the noise parameter may be updated when no speech is present.

The first speech parameter can be indicative of features of non-speech. The first speech parameter can be indicative of non-user speech. The first speech parameter can be indicative of non-speaker speech. For example, speech that is not directly relevant to the main speaker/user of the audio device.

In one or more example audio devices, to process the first microphone input signal and the second microphone input signal can include to determine a second speech parameter. The second speech parameter can be indicative of speech. The second speech parameter can be indicative of speech based on the first microphone input signal and the second microphone input signal. To determine a first distractor attenuation parameter can be based on the first distractor indicator and the second speech parameter.

The second speech parameter can be indicative of features of speech. The second speech parameter can be indicative of user speech. The second speech parameter can be indicative of non-user speech.

In one or more example audio devices, to determine a second speech parameter can include to obtain one or more speech features. The one or more speech features can be associated with the first microphone input signal and/or the second microphone input signal. The one or more speech features can be associated with the first microphone input signal. The one or more speech features can be associated with the second microphone input signal. The second speech parameter can be based on one or more speech features of the first microphone input signal and/or the second microphone input signal.

The second speech parameter can be based on one or more speech features of the first microphone input signal. The second speech parameter can be based on one or more speech features of the second microphone input signal. A speech feature can be associated with the first beamforming output signal. A speech feature can be associated with the second beamforming output signal. For example, the second speech parameter may be based on a first output feature associated with the first beamforming output signal. The second speech parameter can be based on one or more speech features associated with the first beamforming output signal and/or the second beamforming output signal.

The one or more speech features may be obtained, for example, from a feature extractor.

In one or more example audio devices, the first distractor attenuation parameter, in accordance with the second speech parameter being indicative of presence of speech, is set to a pass-through value. In one or more example audio devices, the first distractor attenuation parameter, in accordance with the second speech parameter not being indicative of presence of speech, is not set to a pass-through value. The pass-through value may be, for example, a 1 or a 0.

A pass-through value can be indicative of passing through, i.e. that no attenuation is performed. For example, no action may be taken based on the pass-through value. The pass-through value may be configured to turn on or off attenuation, e.g. in one or more frequency bands. For example, when a main speaker is talking, the first distractor attenuation parameter may allow for the main speaker to not be attenuated in the low frequency range.

In one or more example audio devices, to process the first microphone input signal and the second microphone input signal can include to determine a beamformer performance parameter, e.g. in the processor/suppressor module. The beamformer performance parameter can be indicative of a performance of a beamformer on the first microphone input signal and the second microphone input signal. To determine a second distractor attenuation parameter can be based on the second distractor parameter and the beamformer performance parameter.

The beamformer performance parameter can be obtained, for example, from a feature extractor. The beamformer parameter can be indicative of a beamforming performance. For example, if there is a lot of reverb, certain attenuation can break down. By using a beamforming performance parameter, the second distractor attenuation parameter can be associated with reverb, and can therefore degrade with reverb. This can be particular useful for when a user is standing in front of a screen, or other surface that may cause such a reverb.

In one or more example audio devices, the beamformer performance parameter can be based on non-voice presence control signal. The non-voice presence control signal can be from a non-voice activity detector. The beamformer performance parameter can be based on voice presence control signal. The voice presence control signal can be from a voice activity detector.

The voice activity detector and/or the non-voice activity detector may be a component of the audio device. The voice activity detector and/or the non-voice activity detector may be separate from the audio device.

In one or more example audio devices, to determine the second distractor attenuation parameter can include to determine whether a second limit criterion is satisfied. In accordance with a determination that the second limit criterion is satisfied, the processor/noise suppressor module may limit the second distractor attenuation parameter based on a second gain limit. In accordance with a determination that the second limit criterion is not satisfied, the processor/noise suppressor module may not limit the second distractor attenuation parameter based on a second gain limit.

The attenuator gain can be a gain vector. The attenuator gain can be a gain vector with frequency band gains.

In one or more example audio devices, the attenuator gain can include one or more gain values, such as one or more low-frequency gains at frequencies below a low-frequency threshold, one or more intermediate-frequency gains at frequencies between the low-frequency threshold and a high-frequency threshold, and one or more high-frequency gains at frequencies above the high-frequency threshold. The one or more gain values, such as the intermediate-frequency gains, can each be an interpolation of or between the first distractor attenuation parameter and the second distractor attenuation parameter.

Noise suppression scheme can be configured to reduce gain. The noise suppression scheme can be configured to be an attenuation scheme.

Advantageously, the audio device can be configured to determine how close or far a source of noise is. The noise suppression scheme can be configured to adjust ratios between, for example, a first microphone facing a first direction and a second microphone facing a second direction.

The noise suppression scheme can be configured to focus, such as target, on non-ambient noise. For example, it could be focused on a specific point, such as a specific location. It may not target cocktail party like speech, where the noise comes from everywhere and may be considered ambient in nature. Alternatively, the noise suppression scheme can be configured to focus, such as target, on ambient noise. The noise suppression scheme can be configured to focus, such as target, on a distractor.

In one or more example audio devices, to process the first microphone input signal and the second microphone input signal comprises to determine a primary gain with a primary attenuator based on one or more features associated with the first microphone input signal and/or the second microphone input signal; determine a secondary gain with a secondary attenuator based on one or more features associated with the first microphone input signal and/or the second microphone input signal; determine a noise suppression scheme based on the primary gain and/or the secondary gain; and apply the noise suppression scheme to a first beamforming output signal for provision of the output audio signal.

Advantageously, the audio device/suppressor module may use multiple attenuators. The attenuators can be specialized for the attenuation of particular features. This may allow for the attenuators to be optimized for the best possible noise feature discrimination, rather than needing each one to also be optimized for the best sounding output as well.

The primary gain may be indicative of gain to be applied. The primary gain may be indicative of attenuation to be applied. The secondary gain may be indicative of gain to be applied. The secondary gain may be indicative of attenuation, such as suppression, to be applied.

In one or more example audio devices, the primary gain can be determined to attenuate or suppress a first noise signal in the first beamforming output signal. In one or more example audio devices, the secondary gain can be determined to attenuate or suppress a second noise signal in the first beamforming output signal. The first noise signal can be different from the second noise signal.

For example, the first noise signal may be from a different source than the second noise signal. The first noise signal may be a different type of noise from the second noise signal. The primary gain and the secondary gain may be configured to attenuate or distress different noises.

The one or more features associated with the first microphone input signal and the second microphone input signal may be obtain, for example, from a feature extractor.

The noise suppression scheme may be an attenuation scheme. The noise suppression scheme may be indicative of modifications, such as attenuations, to be made.

In one or more example audio devices, to determine a noise suppression scheme can include to determine a first weight factor of the primary gain and a second weight factor of the secondary gain. In one or more example audio devices, to determine a noise suppression scheme can include to determine a first weight factor of the primary gain.

In one or more example audio devices, to determine a noise suppression scheme can include to determine a second weight factor of the secondary gain.

The first weight factor percentage and/or the second weight factor percentage may be fixed. The first weight factor percentage and/or the second weight factor percentage may be variable. The first weight factor percentage and/or the second weight factor percentage may be determined by artificial intelligence, such as machine learning. The first weight factor percentage and/or the second weight factor percentage may be set by a user, or during factory manufacturing.

The first weight factor percentage and the second weight factor percentage may add up to 100 percent. The first weight factor percentage and the second weight factor percentage may add up to less than 100 percent.

In one or more example audio devices, to determine a noise suppression scheme based on the primary gain and the secondary gain can include to determine the noise suppression scheme based on one or more, such as all of, the primary gain, the first weight factor, the secondary gain, and the second weight factor. In one or more example audio devices, to determine a noise suppression scheme based on the primary gain and the secondary gain can include to determine the noise suppression scheme based on one or more of: the primary gain, the first weight factor, the secondary gain, and the second weight factor.

In one or more example audio devices, to determine a noise suppression scheme based on the primary gain and the secondary gain can include to determine the noise suppression scheme based on the primary gain multiplied with the secondary gain. In one or more example audio devices, to determine a noise suppression scheme based on the primary gain and the secondary gain can include to determine the noise suppression scheme based on the primary gain added with the secondary gain. In one or more example audio devices, to determine a noise suppression scheme based on the primary gain and the secondary gain can include to determine the noise suppression scheme based on the primary gain combined with the secondary gain.

Further factors, variables, functions, etc. can be used to determine the noise suppression scheme. In one or more example audio devices, to determine a noise suppression scheme can include to combine the primary gain and the secondary gain into a combined gain. In one or more example audio devices, to determine a noise suppression scheme can include to apply a compensation function to the combined gain for provision of a compensated gain. In one or more example audio devices, to determine a noise suppression scheme can include to determine the noise suppression scheme based on the compensated gain.

The compensation function can be used, for example, to correct errors. It can be used to adjust too effective and/or non-working combined gains.

In one or more example audio devices, the compensation function can be determined to increase one or more of a speech intelligibility and a listening comfort of the output audio signal.

The primary attenuator may be, for example, a primary distractor, a primary distractor attenuator, and/or a primary estimator. The primary attenuator may be configured to determine what is or is not a distractor. In accordance with the primary attenuator determining that there is not a distractor, the primary attenuator can pass through any signal.

In one or more example audio devices, the primary attenuator can be a distractor attenuator. The primary attenuator can be configured to determine the primary gain based on a front plane near field noise feature associated with the first microphone input signal and the second microphone input signal.

The secondary attenuator may be, for example, a secondary distractor, a secondary distractor attenuator, and/or a secondary estimator. The secondary attenuator may be configured to attenuate different sounds, noises, and/or signals as compared to the primary attenuator. The audio device may have multiple secondary attenuators.

In one or more example audio devices, the secondary attenuator can be a static noise attenuator. The secondary attenuator can be configured to determine the secondary gain based on a static noise feature associated with the first microphone input signal and the second microphone input signal. The secondary attenuator can be configured to determine if there is static noise.

In one or more example audio devices, to process the first microphone input signal and the second microphone input signal can include to determine a tertiary, such as a third, gain with a tertiary attenuator. To determine a tertiary gain with a tertiary attenuator can be based on one or more features associated with the first microphone input signal and the second microphone input signal. To determine a noise suppression scheme based on the primary gain and the secondary gain can include to determine the noise suppression scheme based on the primary gain, the secondary gain, and the tertiary gain.

The tertiary attenuator may be, for example, a tertiary distractor, a tertiary distractor attenuator, and/or a tertiary estimator. The tertiary attenuator may be configured to attenuate different sounds, noises, and/or signals as compared to the primary attenuator and/or the secondary attenuator.

In one or more example audio devices, the tertiary attenuator is a noise attenuator. The tertiary attenuator can be configured to determine the tertiary gain based on a vehicle noise feature associated with the first microphone input signal and the second microphone input signal.

Vehicle noise features can be indicative of any type of vehicle noise, and the particular vehicle noise is not limiting. In one or more example audio devices, the vehicle noise feature can be one or more of: a car noise feature, a train noise feature, a boat noise feature, and a plane noise feature.

Noise features, such as static noise features, vehicle noise features, front plane noise features, can be determined in a number of ways. For example, noise features may be determined from a stored set of noise features. Noise features can be determined via artificial intelligence. Noise features can be determined via machine learning. The noise features can be obtained from a feature extractor.

In one or more example audio devices, the tertiary attenuator can be configured to determine the tertiary gain based on a user selection parameter and one or more features associated with the first microphone input signal and the second microphone input signal.

A user selection parameter can be indicative of a selection by a user. For example, a user may be able to input a user selection parameter.

In certain examples, the audio device may include a series of parallel attenuators. Alternatively, or in conjunction, the audio device may have a cascade of attenuators, such as one or more attenuators being in series.

Further gains can also be determined via further attenuators. For example, quaternary and/or quinary gains can be determined with a respective quaternary and/or quinary attenuators, for example based on one or more features associated with the first microphone input signal and the second microphone input signal. Further attenuators may be specially designed attenuators, such as for attenuating a particular noise feature.

These further attenuators may be easily added into the audio device. Further, they may have access to centralized data in the audio device, so important features may not need to be computed more than once.

In one or more audio devices, to process the first microphone input signal and the second microphone input signal can include to apply a first beamforming to the first microphone input signal and the second microphone input signal. Applying a first beamforming can be for provision of the first beamforming output signal.

Also disclosed is a method for operating an audio device. The method comprises obtaining a first microphone input signal and a second microphone input signal; processing the first microphone input signal and the second microphone input signal for provision of an output signal; and outputting the output signal.

In one or more example methods, obtaining the first microphone input signal and the second microphone input signal comprises: obtaining a first microphone signal and a second microphone signal; determining a gain compensation scheme based on the first microphone signal and the second microphone signal; and compensating a gain of one or both of the first microphone signal and the second microphone signal in accordance with the gain compensation scheme for provision of the first microphone input signal and the second microphone input signal, wherein determining the gain compensation scheme comprises: applying a plurality of test compensation schemes to the first microphone signal and the second microphone signal; determining a performance parameter for each of the test compensation schemes; and selecting the gain compensation scheme based on the performance parameters.

In one or more example methods, processing the first microphone input signal and the second microphone input signal comprises determining a first set of covariance parameters based on the first microphone input signal and/or the second microphone input signal; determining a second set of covariance parameters based on the first microphone input signal and/or the second microphone input signal; determining a first beamforming based on the first set of covariance parameters and/or the second set of covariance parameters; applying the first beamforming to the first microphone input signal and the second microphone input signal for provision of a first beamforming output signal; optionally determining a second beamforming based on the first set of covariance parameters and/or the second set of covariance parameters; optionally applying the second beamforming to the first microphone input signal and the second microphone input signal for provision of a second beamforming output signal; and providing the output audio signal based on the first beamforming output signal and/or the second beamforming output signal. The first beamforming may be determined to increase a relative amount of speech of a user in the first beamforming output signal, and the second beamforming is optionally determined to decrease a relative amount of speech of the user in the second beamforming output signal.

In one or more example methods, processing the first microphone input signal and the second microphone input signal comprises determining a first distractor indicator based on one or more features associated with the first microphone input signal and/or the second microphone input signal; determining a first distractor attenuation parameter based on the first distractor indicator; optionally determining a second distractor indicator based on one or more features associated with the first microphone input signal and/or the second microphone input signal; optionally determining a second distractor attenuation parameter based on the second distractor indicator; determining an attenuator gain based on the first distractor attenuation parameter and/or the second distractor attenuation parameter; and applying a noise suppression scheme to a first beamforming output signal according to the attenuator gain for provision of the output audio signal.

In one or more example methods, processing the first microphone input signal and the second microphone input signal comprises determining a primary gain with a primary attenuator based on one or more features associated with the first microphone input signal and/or the second microphone input signal; optionally determining a secondary gain with a secondary attenuator based on one or more features associated with the first microphone input signal and/or the second microphone input signal; determining a noise suppression scheme based on the primary gain and/or the secondary gain; and applying the noise suppression scheme to a first beamforming output signal for provision of the output audio signal.

FIG. 1 discloses an example audio device 10 according to the disclosure. The audio device 10 may be single audio device, such as shown in FIG. 1, or may be a system of devices which can communicate together. The audio device 10 may include an interface, a memory, and a processor. The processor implements, or comprises, one or more of an input module 12, a pre-processing module 14, a beamformer module 16, a controller 18, a suppressor module 22, a combiner module 24, and an output module 25.

As shown, the audio device 10 can include an input module 12. The input module 12 can be configured to receive audio signals. For example, the input module 12 can receive audio signals from one or more microphones. The input module 12 may include one or more microphones including first microphone 13A and second microphone 13B. The input module 12 may comprise one or more analog-to-digital (A/D) converters for A/D conversion of the received audio signals and/or of audio signals from the one or more microphones. The input module 12 may comprise one or more fast Fourier transformation (FFT) modules or comprise one or more filter banks, such as filter bank 12A for provision of multi-band or multi-channel, such as K-band/channel, microphone signals 26, 28.

The input module 12 can be configured to perform processing, such as one or more modifications, to any audio signals received. For example, the input module 12 can include one or more filter banks, such as an analysis filter bank, that can filter and/or separate the audio signals, e.g. into multiple frequency channels. For example, the input module 12 can be configured to filter out certain frequencies.

The input module 12 can be configured to output a first microphone signal 26 and a second microphone signal 28. The first microphone signal 26 can be received from a first microphone while the second microphone signal 28 can be received from a second microphone. The first microphone signal 26 and the second microphone signal 28 may be multi-channel signals, e.g. with at least 20 channels/bands/bins. In other words, the first microphone signal and the second microphone may be multi-band signals with K frequency channels/bands/bins, e.g. where K is larger than 10 or even larger than 20.

The input module 12 can be configured to send data, such as the first microphone signal 26 and the second microphone signal 28, to the controller 18 and/or receive data from the controller 18, such as control signal 38A. A feature extractor 20 can be configured to extract one or more features from the data, such as from the first microphone signal 26 and the second microphone signal 28, received from the input module 12.

The audio device 10 may comprise a pre-processor module 14. The pre-processor module 14 may be configured to receive the first microphone signal 26 and the second microphone signal 28. The pre-preprocessor module 14 can be configured to process the first microphone signal 26 and the second microphone signal 28, such as discussed herein. For example, the pre-processor module may be configured to compensate the first microphone signal 26 and/or the second microphone signal 28. In other words, the pre-processor module 14 can be configured to perform microphone sensitivity compensation on the first microphone signal 26 and/or the second microphone signal 28. Thus, the pre-processor module may also be denoted a microphone sensitivity compensator. The pre-processor module 14 can be configured to output a first microphone input signal 30 and a second microphone input signal 32.

The pre-processor module 14 can be configured to send data, such as the first microphone input signal 30 and/or the second microphone input signal 32, to the controller 18 and/or receive data from the controller 18, such as control signal 38B. A feature extractor 20 can be configured to extract one or more features from the data, such as from the first microphone input signal 30 and/or the second microphone input signal 32, received from the pre-processor module 14.

The audio device 10 may comprise a beamformer module 16. The beamformer module 16 may be configured to receive the first microphone input signal 30 and/or the second microphone input signal 32. The beamformer module 16 can be configured to apply beamforming, such as a first beamforming and a second beamforming, to the first microphone input signal 30 and the second microphone input signal 32 as discussed herein. The beamformer module 16 can be configured to output a first beamforming output signal 17A and/or a second beamforming output signal 17B. As shown in FIG. 1, the first beamforming output signal 17A may be output/transmitted to the combiner module 24. The second beamforming output signal 17B may be output/transmitted to controller 18, such as to the feature extractor 20, and/or to suppressor module 22.

The beamformer module 16 can be configured to send data, such as the first beamforming output signal 17A and/or the second beamforming output signal 17B, to the controller 18 and/or receive data from the controller 18, such as control signal 38C. A feature extractor 20 can be configured to extract one or more features from the data, such as from the first beamforming output signal 17A and/or the second beamforming output signal 17B, received from the beamformer module 16.

The audio device 10 comprises a controller 18. The controller 18, such as the feature extractor 20, may be configured to determine and/or output/transmit one or more features 40 associated with one or more of signals 26, 28, 30, 32, 17A, 17B. For example the controller 18, such as the feature extractor 20, may be configured to determine and/or output/transmit one or more first input features 40A associated with the first microphone input signal 30 and/or one or more second input features 40B associated with the second microphone input signal 32 to suppressor module 22.

Thus, the audio device, such as the processor/controller 18 can include, or be associated with, a feature extractor 20 for provision of features associated with signals in the audio device 10.

The controller 18 is optionally configured to control the first beamforming and/or the second beamforming based on one or more features, e.g. via control signal 38C.

The feature extractor 20 can be configured to determine one or more first input features 40A associated with the first microphone input signal 30. The controller 18 may be configured to control one or more of input module 12, pre-processor module 14, beamformer module 16, and suppressor module 22 based on one or more of the first input features 40A. For example, the controller 18 is optionally configured to control the first beamforming and/or the second beamforming based on one or more features of the first input features 40A.

The feature extractor 20 can be configured to determine one or more second input features 40B associated with the second microphone input signal 32. The controller 18 may be configured to control one or more of input module 12, pre-processor module 14, beamformer module 16, and suppressor module 22 based on one or more of the second input features 40B. The controller 18 is optionally configured to control the first beamforming and/or the second beamforming based on one or more features of the second input features 40B.

The feature extractor 20 can be configured to determine one or more first output features 40C associated with the first beamforming output signal 17A. The controller 18 may be configured to control one or more of input module 12, pre-processor module 14, beamformer module 16, and suppressor module 22 based on one or more of the first output features 40C. The controller 18 is optionally configured to control the first beamforming and/or the second beamforming based on one or more features of the first output features 40C.

The feature extractor 20 can be configured to determine one or more second output features 40D associated with the second beamforming output signal 17B. The controller 18 may be configured to control one or more of input module 12, pre-processor module 14, beamformer module 16, and suppressor module 22 based on one or more of the second output features 40D. The controller 18 is optionally configured to control the first beamforming and/or the second beamforming based on one or more features of the second output features 40D.

The feature extractor 20 can be configured to determine one or more common output features 40E associated with the first beamforming output signal 17A and the second beamforming output signal 17B. The controller 18 may be configured to control one or more of input module 12, pre-processor module 14, beamformer module 16, and suppressor module 22 based on one or more of the common output features 40E. The controller 18 is optionally configured to control the first beamforming and/or the second beamforming based on one or more features of the common output features 40E.

The feature extractor 20 can be configured to determine one or more common input features 40F associated with the first microphone input signal 30 and the second microphone input signal 32. The controller 18 may be configured to control one or more of input module 12, pre-processor module 14, beamformer module 16, and suppressor module 22 based on one or more of the common input features 40F. The controller 18 is optionally configured to control the first beamforming and/or the second beamforming based on one or more features of the common output features 40F.

The audio device 10 may comprise a suppressor module 22. The suppressor module 22 can be configured to determine a suppression scheme, such as a noise suppression scheme, to be applied to the first beamforming output signal 17A, e.g. by provision of suppressor output 22A, such as based on one or more of features 40, 40A, 40B, 40C,40D, 40E, 40F. The suppressor module 22 can be configured to transmit the suppression scheme to the combiner module 24. In other words, the suppressor output 22A may comprise or define the (noise) suppression scheme. The suppressor module 22 optionally comprises a primary attenuator 23A configured to determine a primary gain of or used in the noise suppression scheme. The suppressor module 22 optionally comprises a secondary attenuator 23B configured to determine a secondary gain of or used in the noise suppression scheme. The suppressor module 22 optionally comprises a tertiary attenuator 23C configured to determine a tertiary gain of or used in the noise suppression scheme.

The audio device 10 may comprise a combiner module 24. The combiner module 24 can be configured to combine data, such as the first beamforming output signal 17A and the suppressor output 22A. For example, the combiner module 24 can combine, such as filter, suppress, mix, add, and/or subtract, the first beamforming output signal 17A with or based on the suppressor output 22A for provision of a combined signal 34.

The audio device 10 may comprise an output module 25. The combiner module 24 can output the combined signal 34 to the output module 25. The output module 25 can include one or more of any of a finite impulse response (FIR) filter, an infinite impulse response (IIR) filter, an inverse FFT module, a digital-to-analog (D/A) converter, a transceiver, a loudspeaker, and a connector as examples. The output module 25 can be configured to output an output audio signal 36.

Figure 2:
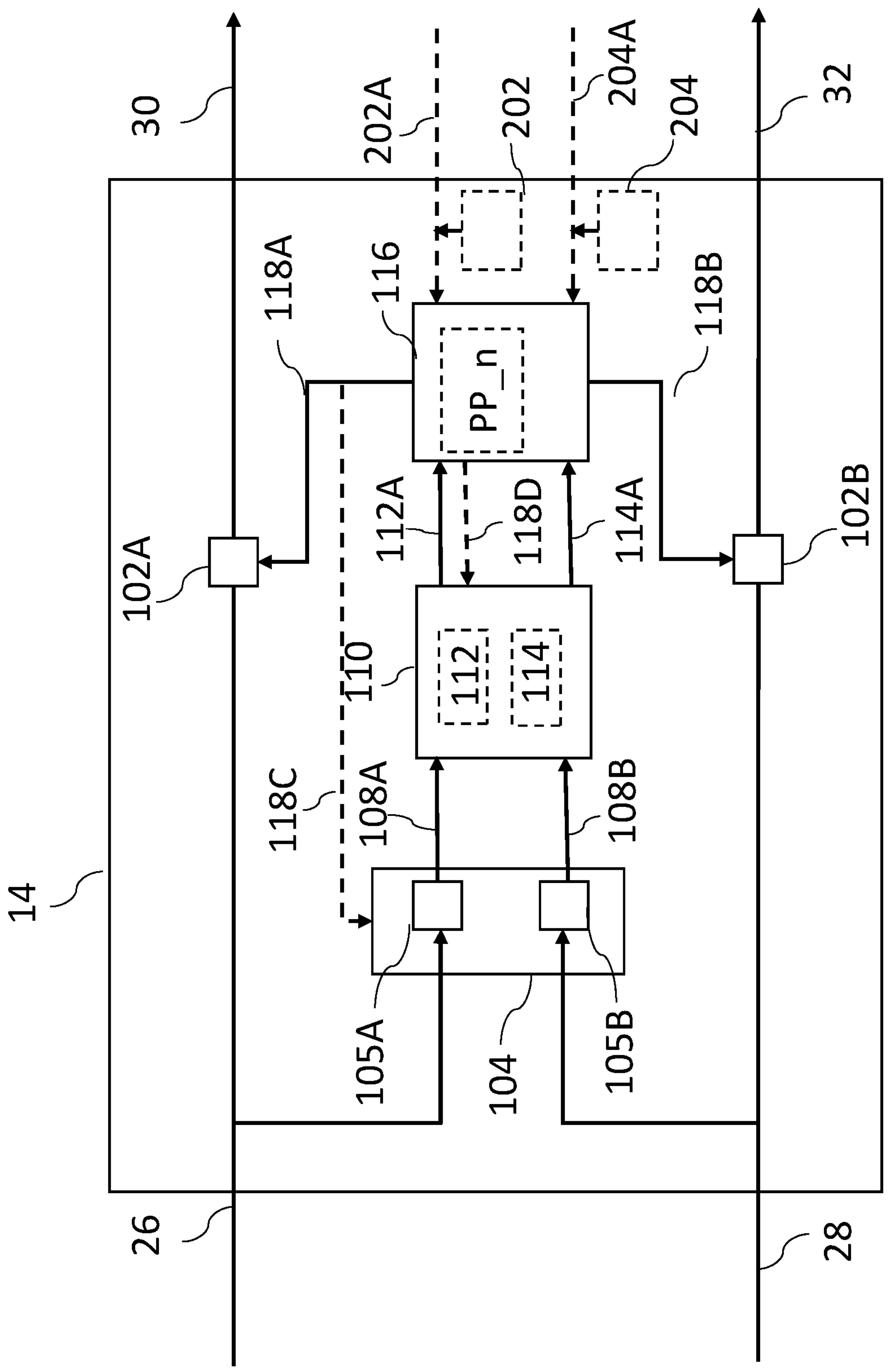
FIG. 2 illustrates an example pre-processor module according to the disclosure.

FIG. 2 illustrates an example pre-processor module 14 of the audio device 10. As shown, the pre-processor module 14 receives the first microphone signal 26 and the second microphone signal 28, e.g. from interface/input module 12 of the audio device. The pre-processor module 14 can be a part of and/or operated via the processor of the audio device 10. Advantageously, the pre-processor module 14 can be used to obtain, determine, provide the first microphone input signal 30 and the second microphone input signal 32.

The pre-processor module 14 can be configured to obtain the first microphone signal 26 and the second microphone signal 28, determine a gain compensation scheme 102 based on the first microphone signal 26 and the second microphone signal 28, and apply the gain compensation scheme 102 to the first microphone signal 26 and the second microphone signal 28 for provision of respectively the first microphone input signal 30 and the second microphone input signal 32. To apply the gain compensation scheme 102 comprises to compensate a gain of one or both of the first microphone signal 26 with first gain compensation 102A and the second microphone signal 28 with second gain compensation 1028 in accordance with the gain compensation scheme 102 for provision of the first microphone input signal 30 and the second microphone input signal 32.

As shown, to determine the gain compensation scheme 102 includes applying a plurality of test compensation schemes 104 to the first microphone signal 26 and the second microphone signal 28 and determine a performance parameter PP_n for each of the test compensation schemes 104. The pre-processor module 14 can be configured to select the gain compensation scheme 102 applied in first gain compensation 102A and/or second gain compensation 102B based on the performance parameters PP_n.

For example, the pre-processor module 14 can receive the first microphone signal 26 and the second microphone signal 28 and apply a number of test compensation schemes TCS_n, n=1, 2, . . . , N in order to determine which of the test compensation schemes TCS_n to apply as the compensation scheme with first gain compensation 102A and/or second gain compensation 102B.

To apply a plurality of test compensation schemes 104 can include to apply, for each test compensation scheme, a gain setting. The pre-processor module 14 can be configured to apply N gain settings GS_n each defining a gain g_1_*n*, g_2_*n*, n=1, 2, . . . N, to the first microphone signal 26 and the second microphone signal 28 with first test gain 105A and second test gain 105B, respectively, for provision of a first microphone test signal 108A (MTS_1_*n*) and a second microphone test signal 1088 (MTS_2_*n*) for each gain setting. In other words, the first test gain 105A applies gains g_1_*n*, n=1, 2, . . . N to the first microphone signal 26, such as to one or more, such as M, first narrow-band signals each covering a respective frequency band of the first microphone signal, for provision of first microphone test signal 108, and the second test gain 105B applies gains g_2_*n*, n=1, 2, . . . , N to the second microphone signal 28, such as to one or more, such as M, second narrow-band signals each covering a respective frequency band of the second microphone signal, for provision of second microphone test signal 1088. The first test gain 105A may apply test gains to in the range from 2 to 10, such as 4, first narrow-band signals of the first microphone signals, and the second test gain 105B may apply test gains to in the range from 2 to 10, such as 4, second narrow-band signals of the second microphone signal. In other words, the test compensation schemes may be applied to a subset of first narrow-band signals of the first microphone signal and a subset of second narrow-band signals of the second microphone signal. Preferably, the subset of first narrow-band signals of the first microphone signal and a subset of second narrow-band signals of the second microphone signal cover identical frequency bands. In other words, the first microphone test signal 108A and the second microphone test signal 1088 may be M-band signals, e.g. where M is in the range from 2 to 10, such as 4.

The pre-processor module 14 comprises a test beamformer 110 configured for beamforming of the microphone test signals 108A, 1088.

The pre-processor module 14/test beamformer 110 can be configured to apply, for each test compensation scheme, a first test beamforming 112 to the first microphone test signal 108A and the second microphone test signal 1088 for provision of a first test beamforming output 112A. The pre-processor module 14 can be configured to apply, for each test compensation scheme, a second test beamforming 114 to the first microphone test signal 108A and the second microphone test signal 1088 for provision of a second test beamforming output 114A.

In FIG. 2, to apply a plurality of test compensation schemes 104 comprises to apply, for each test compensation scheme TCS_n, n=1, 2, . . . N, test beamforming to the first microphone test signal 108A and the second microphone test signal 1088 with test beamformer 110. The test beamformer applies, for each test compensation scheme TCS_n, n=1, 2, . . . N, a first test beamforming 112 to the first microphone test signal 108A and the second microphone test signal 1088 for provision of a first test beamforming output 112A. The test beamformer 110 applies, for each test compensation scheme TCS_n, n=1, 2, . . . N, a second test beamforming 114 to the first microphone test signal 108A and the second microphone test signal 1088 for provision of a second test beamforming output 114A. The first test beamforming output 112A and the second test beamforming output 114A may be M-band signals, e.g. where M is in the range from 2 to 10, such as 4.

The first test beamforming 112 can have a first directionality being a first order directionality, such as a cardioid directionality, configured to increase a relative amount of speech in the first test beamforming output 112A. The second test beamforming 114 can have a second directionality being a first order directionality, such as a cardioid directionality, configured to decrease a relative amount of speech in the second test beamforming output 114A. The second test beamforming 114 can be spatially opposite the first test beamforming 112.

The pre-processor module 14 comprises a compensation scheme controller 116 configured to control first compensation gain 102A and second compensation gain 1028 based on microphone test signals 112A, 114A from the test beamformer 110.

The pre-processor module 14/compensation scheme controller 116 is configured to, for each test compensation scheme TCS_n, n=1, 2, . . . N, determine a performance parameter PP_n based on one or more of first microphone test signal 108A, second microphone test signal 108B, first test beamforming output 112A, and second test beamforming output 114A. For example, as illustrated in FIG. 2, compensation scheme controller 116 of pre-processor module 14 is configured to determine performance parameters PP_n, n=1, 2, . . . N based on the first test beamforming output 112A (TBO_1_*n*) and the second test beamforming output 114A (TBO_2_*n*).

The performance parameter PP_n of each test compensation scheme TCS_n can be based on a ratio between the first test beamforming output 112A and the second test beamforming output 114A. The performance parameter PP_n of each test compensation scheme TCS_n can be based on a difference between the first test beamforming output 112A and the second test beamforming output 114.

The pre-processor module 14/compensation scheme controller 116 selects the gain compensation scheme applied in gain compensations 102A and 102B based on the performance parameters PP_n, n=1, 2, . . . N via first gain control signal 118A to first gain compensation 102A and second gain control signal 118B to second gain compensation 102B. For example, as illustrated in FIG. 2, compensation scheme controller 116 of pre-processor module 14, selects the gain compensation scheme as a test compensation scheme of the plurality of test compensation schemes TCS_n, n=1, 2, . . . , N having a maximum or largest performance parameter of the performance parameters PP_n, n=1, 2, . . . , N.

One of the gains g_1_*n*, g_2_*n* may for all n=1, 2, . . . , N equal unity gain, i.e. a gain that does not alter the signal that it is applied to. In other words, the plurality of test compensation schemes 104 may apply gains to only one of the first microphone signal 26 and the second microphone signal 28, and in this case, the respective one of the first test gain 105A and the second test gain 105B may be omitted.

After selecting the gain compensation scheme, the compensation scheme controller 116 may adjust the gain compensation scheme 102 to provide for a balanced gain compensation of the first microphone signal 26 and the second microphone signal 28 by applying a common gain factor to each of gain compensations 102A and 102B such that the product of the gain compensations 102A and 102B equals unity gain. If, for example, the selected gain compensation scheme 102 prescribes a gain compensation 102A of +1 dB and a gain compensation 102B of 0 dB, then the compensation scheme controller 116 may apply a common gain factor of −0.5 dB such that the gain compensation 102A equals +0.5 dB and the gain compensations 102B equals −0.5 dB.

Alternatively, the compensation scheme controller 116 may, after selecting the gain compensation scheme, adjust the gain compensation scheme 102 to provide for an unbalanced gain compensation of the first microphone signal 26 and the second microphone signal 28, e.g. by applying the inverse of one of the gain compensations 102A and 102B to the respective other one of the gain compensations 102A and 102B. If, for example, the selected gain compensation scheme 102 prescribes a gain compensation 102A of +0.5 dB and a gain compensation 102B of −0.5 dB, then the compensation scheme controller 116 may apply the inverse of gain compensation 102B, i.e. +0.5 dB, to the gain compensation 102A resulting in the gain compensation 102A equaling +1 dB. In this case, the compensation scheme controller 116 may set the gain compensation 102B to unity gain, or alternatively, the gain compensation 102B may be omitted.

In other words, the plurality of test compensation schemes 104 may apply test gains 105A, 105B to only one of the first microphone signal 26 and the second microphone signal 28, and the respective other set of test gains 105A, 105B may be omitted. Similarly, the gain compensation scheme 102 may apply a gain compensation 102A, 102B to only one of the first microphone signal 26 and the second microphone signal 28, and the respective other gain compensation 102A, 102B may be omitted.

The compensation scheme controller 116 may control the test compensation schemes 104, e.g. timing and/or gain values, via control signal 118C.

The compensation scheme controller 116 may control the test beamformer via control signal 118D.

The processor, such as the pre-processing module 14, can include a voice activity detector 202 configured to detect presence of voice activity, e.g. based on one or more of the first microphone signal 26, the second microphone signal 28, the first microphone input signal 30, and the second microphone input signal 32. The voice activity detector optionally feeds a voice presence control signal 202A indicative of a detection of voice to the pre-processing module 14/compensation scheme controller 116. To determine the compensation scheme may be performed in accordance with a detection of presence of voice activity, i.e. based on the voice presence control signal 202A. The voice activity detector 202 may be implemented in the pre-processor module 14 or external to the pre-processor module 14. In one or more example audio devices, to determine the compensation scheme 102 is paused in accordance with a detection of absence of voice activity, e.g. as indicated by the voice presence control signal 202A.

The processor, such as for the pre-processing module 14, can include a noise or non-voice activity detector 204 configured to detect presence of noise or non-voice, e.g. based on one or more of the first microphone signal 26, the second microphone signal 28, the first microphone input signal 30, and the second microphone input signal 32. The noise detector optionally feeds a noise or non-voice presence control signal 204A indicative of a detection of noise/non-voice to the pre-processing module 14/compensation scheme controller 116. To determine the gain compensation scheme 102 may be performed in accordance with a detection of presence of non-voice activity, i.e. based on the non-voice presence control signal 204A. The non-voice activity detector 204 may be implemented in the pre-processor module 14 or external to the pre-processor module

14. In one or more example audio devices, to determine the compensation scheme 102 is paused in accordance with a detection of presence of noise, e.g. as indicated by the non-voice presence control signal 204A.

The pre-processor module 14 can be configured to obtain one or more first narrow-band signals each covering a respective frequency band of the first microphone signal 26 and to obtain one or more second narrow-band signals each covering a respective frequency band of the second microphone signal 28 and determine a gain compensation scheme 102 including to determine the gain compensation scheme 102 based on the one or more first narrow-band signals and the one or more second narrow-band signals.

The pre-processor module 14 can be configured to compensate a gain of one or both of the first microphone signal 26 and the second microphone signal 28 including to compensate the gain of one or both of the first microphone signal 26 and the second microphone signal 28 at signal frequencies outside the respective frequency bands of the one or more first narrow-band signals and the one or more second narrow-band signals.

Figure 3:
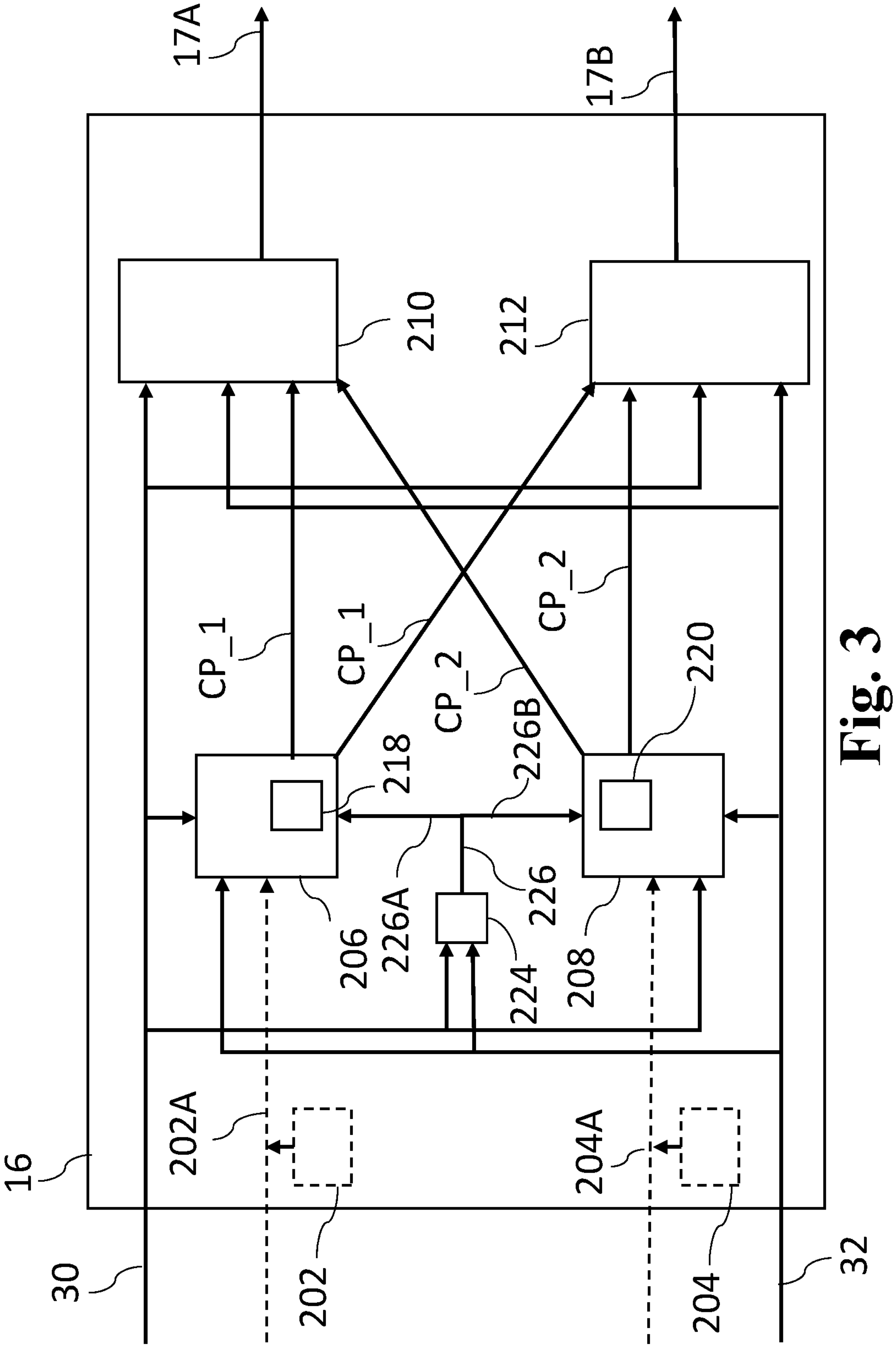
FIG. 3 illustrates an example beamformer module according to the disclosure.

FIG. 3 illustrates an example beamformer module 16 of the audio device 10. The beamformer module 16 may be implemented in processor of the audio device 10. The processor/beamformer module 16 can be configured to process the first microphone input signal 30 and the second microphone input signal 32, such as for provision of a first beamforming output signal 17A and a second beamforming output signal 17B.

To process the first microphone input signal 30 and the second microphone input signal 32 can include to determine a first set of covariance parameters 206, such as based on the first microphone input signal 30 and the second microphone input signal 32.

To process the first microphone input signal 30 and the second microphone input signal 32 can include to determine a second set of covariance parameters 208, such as based on the first microphone input signal 30 and the second microphone input signal 32.

Thus, the processor/beamformer module 16 is configured to determine a first set of covariance parameters 206, such as a first covariance matrix, and a second set of covariance parameters 208, such as a second covariance matrix, based on the first microphone input signal 30 and the second microphone input signal 32.

The determination of the first set of covariance parameters 206 and/or the second set of covariance parameters 208 may be based on, such as triggered by or initiated based on, voice presence control signal 202A and/or non-voice presence control signal 204A. The voice presence control signal 202A may be fed to the beamformer module 16 or determined by voice activity detector 202 implemented in beamformer module 16. The non-voice presence control signal 204A may be fed to the beamformer module or determined by non-voice activity detector 204 implemented in beamformer module 16.

The processor/beamformer module 16 is configured to, in accordance with a first update criterion 218 being satisfied, update the first set of covariance parameters. The first update criterion 218 may be based on voice presence control signal 202A received from a voice activity detector 202 of the audio device and/or on non-voice presence control signal 204A received from a non-voice activity detector 204 of the audio device. The first update criterion 218 may be satisfied when voice is detected and indicated in the voice presence control signal 202A. In other words, the first set of covariance parameters optionally denoted speech covariance parameters may be indicative of noise covariance.

The processor/beamformer module 16 is configured to, in accordance with a second update criterion 220 being satisfied, update the second set of covariance parameters. The second update criterion 220 may be based on non-voice presence control signal 204A received from a non-voice activity detector 204 of the audio device. The second update criterion 220 may be satisfied when non-voice is detected and indicated in the non-voice presence control signal 204A. In other words, the second set of covariance parameters optionally denoted noise covariance parameters may be indicative of noise covariance.

The beamformer module 16 comprises a first beamformer 210 and optionally a second beamformer 212. The first set of covariance parameters CP_1 and the second set of covariance parameters CP_2 are both fed to the first beamformer 210 The first set of covariance parameters CP_1 and the second set of covariance parameters CP_2 are both fed to the second beamformer 212.

The first beamformer 210 is configured to determine a first beamforming based on the first set of covariance parameters 206 and the second set of covariance parameters 208. The first beamformer 210 is configured to apply the first beamforming for provision of first beamforming output signal 17A.

The second beamformer 212 is configured to determine a second beamforming based on the first set of covariance parameters 206 and the second set of covariance parameters 208. The second beamformer 212 is configured to apply the second beamforming for provision of second beamforming output signal 17B.

The first beamformer 210 determines the first beamforming to increase a relative amount of speech of a user in the first beamforming output signal 17A and the second beamformer 212 determines the second beamforming to decrease a relative amount of speech of the user in the second beamforming output signal 17B.

The first beamforming and/or the second beamforming can be implemented as generalized eigenvalue beamforming, e.g. using blind analytical normalization. The first beamformer 210 repeatedly determines the first beamforming based on the first set of covariance parameters CP_1 and the second set of covariance parameters CP_2 by applying an algorithm for determining a beamformer that increases a relative amount of speech of a user in its output signal. Many such algorithms are known in the art, such as algorithms for determining generalized eigenvalue beamforming using blind analytical normalization. The second beamformer 212 determines the second beamforming based on the first set of covariance parameters CP_1 and the second set of covariance parameters CP_2 by applying an algorithm for determining a beamformer that decreases a relative amount of speech of the user in its output signal. Many such algorithms are known in the art, such as algorithms for determining generalized eigenvalue beamforming using blind analytical normalization.

The processor/beamformer module 16 is optionally configured to, e.g. in block/determiner 224, determine a forgetting parameter 226 based on the first microphone input signal 30 and the second microphone input signal 32. The processor/beamformer module 16 is optionally configured to update the first covariance parameters 206 and/or the second covariance parameters 208 based on the forgetting parameter 226. The processor/beamformer module 16 is optionally configured to determine a first forgetting parameter 226A based on the first microphone input signal 30 and/or the second microphone input signal 32 and update the first covariance parameters 206 based on the first forgetting parameter 226A. The processor/beamformer module 16 is optionally configured to determine a second forgetting parameter 226B based on the first microphone input signal 30 and/or the second microphone input signal 32 and update the second covariance parameters 208 based on the second forgetting parameter 226B. Thereby update of first and second covariance parameters 206, 208 may be separately optimized. The processor/beamformer module 16 is optionally configured to determine a first forgetting parameter 226A such that the first covariance parameters 206 are adapted faster with increasing variation of noise in the first microphone input signal 30 and/or the second microphone input signal 32.

To apply the first beamforming, such as via first beamformer 210, can include to maximize a signal-to-noise ratio of a main speaker. To apply the second beamforming, such as via second beamformer 212, can include to maximize a noise-to-signal ratio.

The processor/beamformer module 16 can be configured to determine the first beamforming, such as via the first beamformer 210, and/or to determine the second beamforming, such as via the second beamformer 212, based on a common first set of covariance parameters and a common second set of covariance parameters.

Using common sets of covariance parameters CP_1 and CP_2 for the beamformer determination may help in reducing the computational load on the processor/beamformer module 16 while still providing optimum beamforming in the first beamformer 210 and the second beamformer 212.

Figure 4:
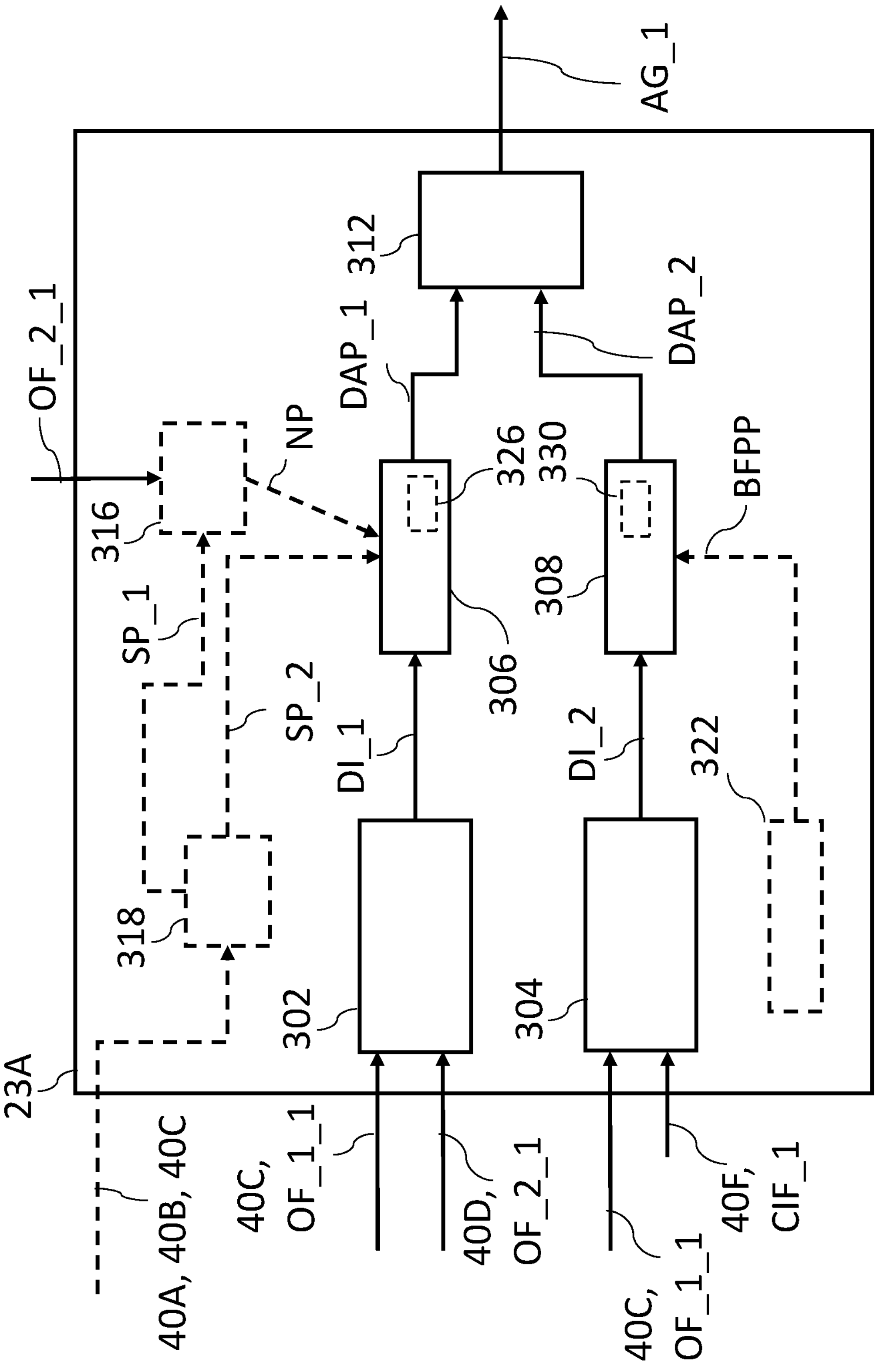
FIG. 4 illustrates an example primary attenuator according to the disclosure.

FIG. 4 illustrates an example primary attenuator 23A of suppressor module 22 of the audio device 10. The suppressor module 22 may be implemented in processor of the audio device 10. The primary attenuator 23A receives one or more of features 40, 40A, 40B, 40C, 40D, 40E, 40F associated with signals 30, 32, 17A, 17B from controller 18/feature extractor 20. In one or more example audio devices 10, the suppressor module 22 is configured to receive the signals 30, 32, 17A, 17B and determine the desired features 40, 40A, 40B, 40C, 40D, 40E, 40F associated with the respective signals 30, 32, 17A, 17B.

The primary attenuator 23A may be configured as a distractor attenuator and is optionally configured to determine one or more distractor indicators including to determine in block/determiner 302 a first distractor indicator DI_1 an/or to determine in block/determiner 304 a second distractor indicator DI_2 based on one or more features 40, 40A, 40B, 40C, 40D, 40E, 40F associated with signals 30, 32, 17A, 17B.

In the example primary attenuator 23A, the first distractor indicator DI_1 is based on first output feature(s) 40C and second output feature(s) 40D. In particular, the first distractor indicator DI_1 is optionally based on a first primary output feature OF_1_1 associated with the first beamforming output signal 17A, the first primary output feature OF_1_1 being a magnitude of the first beamforming output signal 17A, e.g. a magnitude of a speech beamforming output signal. Optionally, the first distractor indicator DI_1 is based on a second primary output feature OF_2_1 associated with the second beamforming output signal 17B, the second primary output feature OF_2_1 being a magnitude of the second beamforming output signal 17B, e.g. a magnitude of a noise beamforming output signal. In other words, the first distractor indicator DI_1 is a function of the first primary output feature OF_1_1 and the second primary output feature.

The first distractor indicator DI_1 may be a low-frequency indicator. Thus, the first distractor indicator DI_1 may be based on low-frequency components of features, such as the first primary output feature OF_1_1 and the second primary output feature OF_2_1. The low-frequency components may be at frequencies less than 2 kHz or less than 1.5 kHz, such as at frequencies in the range from 125 Hz to 1125 Hz in order to provide a large difference between a 0-degree distractor and the main speaker (user).

The first distractor indicator DI_1 may be based on a ratio between the first primary output feature OF_1_1 and the second primary output feature OF_2_1, such as a ratio between low-frequency components of the first primary output feature OF_1_1 and the second primary output feature OF_2_1. A component may be a feature value within a frequency band. The first distractor indicator DI_1 may be a linear combination of ratios between respective low-frequency components (frequency bands) of the first primary output feature OF_1_1 and the second primary output feature OF_2_1, such as an average of ratios for individual frequency bands.

For example, when the first primary output feature and the second primary output feature are magnitudes, the first distractor indicator DI_1 may be given as:

$$DI\_1=\mathrm{Sum}(M\_1\_i/M\_2\_i)/I \text{ for } i=1, \ldots, I,$$

where i is an index of I low-frequency bands, and where M_1_*i* is the magnitude of the first beamforming output signal in the i'th low-frequency band and M_2_*i* is the magnitude of the second beamforming output signal in the i'th low-frequency band.

In the example primary attenuator 23A, the second distractor indicator DI_2 is based on first output feature(s) 40C and one or more of first input feature(s) 40A, second input feature(s) 40B, and common input feature(s) 40F. In particular, the second distractor indicator DI_2 is optionally based on the first primary output feature OF_1_1 associated with the first beamforming output signal 17A, the first primary output feature OF_1_1 being a magnitude of the first beamforming output signal 17A, e.g. a magnitude of a speech beamforming output signal. Optionally, the second distractor indicator DI_2 is based on a first common input feature CIF_1 associated with the first microphone input signal 30 and the second microphone input signal 32, the first common input feature CIF_1 being an omni magnitude. In other words, the second distractor indicator DI_2 is a function of the first primary output feature OF_1_1 and the first common input feature CIF_1.

The second distractor indicator DI_2 may be a high-frequency indicator. Thus, the second distractor indicator DI_2 may be based on high-frequency components of features, such as the first primary output feature OF_1_1 and the first common input feature CIF_1. The high-frequency components may be at frequencies larger than 4 kHz, e.g. larger than 5 kHz, such as at frequencies in the range from 5.5 kHz to 7 kHz.

The second distractor indicator DI_2 may be based on a ratio between the first primary output feature OF_1_1 and the first common input feature CIF_1, such as a ratio between high-frequency components of the first primary output feature OF_1_1 and the first common input feature CIF_1. The second distractor indicator DI_2 may be a linear combination of ratios between respective high-frequency components of the first primary output feature OF_1_1 and the first common input feature CIF_1.

For example, when the first primary output feature is magnitude and the first common input feature is omni magnitudes, the second distractor indicator DI_2 may be given as:

$$DI\_2=\mathrm{Sum}(\mathrm{OMNI}\_j/M\_1\_j)/J \text{ for } j=1, \ldots, J,$$

where j is an index of J high-frequency bands where M_1_*j* is the magnitude of the first beamforming output signal in the j'th high-frequency band and OMNI_j is an omni magnitude associated with the first microphone input signal and/or the second microphone input signal in the j'th high-frequency band.

In other words, to determine a first distractor indicator DI_1 can include to determine a first distractor indicator DI_1 based on one or more features associated with the first microphone input signal 30 and the second microphone input signal 32 in a low-frequency range, such as in a frequency range from 125 Hz to 1125 Hz, and to determine a second distractor indicator DI_2 can include to determine a second distractor indicator DI_2 based on one or more features associated with the first microphone input signal 30 and the second microphone input signal 32 in a high-frequency range, such as in a frequency range from 5.5 kHz to 7 kHz.

The processor/primary attenuator 23A can be configured to determine in block/determiner 306 a first distractor attenuation parameter DAP_1 based on the first distractor indicator DI_1. The first distractor attenuation parameter DAP_1 is optionally based on presence of main speech. In other words, the first distractor attenuation parameter DAP_1 can be set to a pass-through value, i.e no attenuation, in accordance with a detection of main speech.

The processor/primary attenuator 23A can be configured to determine in block/determiner 308 a second distractor attenuation parameter DAP_2 based on second distractor indicator DI_2. The second distractor attenuation parameter DAP_2 is optionally based on a beamformer performance parameter BFPP.

The processor/primary attenuator 23A can be configured to determine, e.g. in block/determiner 312, an attenuator gain AG_1 also denoted primary attenuator gain based on the first distractor attenuation parameter DAP_1 and the second distractor attenuation parameter DAP_2. The (primary) attenuator gain AG_1 may be a gain vector comprising or defining gains for each frequency band. To determine the attenuator gain AG_1 may comprise to set one or more low-frequency gains, e.g. for frequency bands less than a low-frequency threshold to the first distractor attenuation parameter. The low-frequency threshold may be less than 3 kHz, such as in the range from 500 Hz to 2.5 kHz, such as 1 kHz or 2 kHz. To determine the attenuator gain AG_1 may comprise to set one or more high-frequency gains, e.g. for frequency bands larger than a high-frequency threshold to the second distractor attenuation parameter. The high-frequency threshold may be in the range from 500 Hz to 3 kHz, such as 1 kHz or 2 kHz.

To determine the attenuator gain AG_1 may comprise to set one or more intermediate-frequency gains at frequencies between the low-frequency threshold and the high-frequency threshold. To set the intermediate-frequency gains may comprise to interpolate, e.g. by linear interpolation, the intermediate-frequency gains to a value between the first distractor attenuation parameter and the second distractor attenuation parameter.

The primary attenuator 23A is configured to output the attenuator gain vector AG_1 for use in the suppression scheme by the suppressor module 22. In other words, the processor/suppressor module 22 is optionally configured to determine the noise suppression scheme based on the attenuator gain vector AG_1 from the primary attenuator 23A The processor/primary attenuator 23A can be configured to determine, e.g. in noise estimator 316, a noise parameter NP indicative of ambient noise, e.g. based on the first microphone input signal 30 and the second microphone input signal 32, such as based on the second beamforming output signal 17B (that is based on the first microphone input signal 30 and the second microphone input signal 32), e.g. one or of more second output features 40D associated with the second beamforming output signal 17B. In other words, a second output feature associated with the second beamforming output signal 17B, such as the second primary output feature OF_2_1 being a magnitude of the second beamforming output signal, may be used as/constitute a noise feature of the first microphone input signal and/or the second microphone input signal. Thus, to determine a noise parameter NP can include to obtain one or more noise features associated with the first microphone input signal 30 and/or the second microphone input signal 32, and the noise parameter NP can be based on one or more noise features of the first microphone input signal 30 and/or the second microphone input signal 32.

In the example primary attenuator 23A, the noise parameter NP is based on the second primary feature output OF_1_1 described earlier as a noise feature of the first microphone input signal and/or the second microphone input signal. Other features, such as one or more of features 40A, 40B, 40D, 40E, 40F may be used as basis for determining the noise parameter. The noise parameter NP may be an ambient noise estimate indicative of estimated ambient noise, such as a low-frequency ambient noise estimate indicative of estimated ambient noise at low frequencies. Update of the noise parameter may be triggered in accordance with a detection of no main speech, e.g. in main speech detector.

To determine a first distractor attenuation parameter DAP_1 can be based on the first distractor indicator DI_1 and the noise parameter NP.

The primary attenuator 23A optionally comprises a speech detector 318 configured to detect main speech and/or to detect no speech. In other words, the speech detector 318 may be configured to determine and output, optionally to the noise estimator 316, a first speech parameter SP_1 indicative of non-speech based on the first microphone input signal 30 and the second microphone input signal 32, e.g. based on a speech feature associated with one or more of signals 30, 32, 17A, e.g. a speech feature included in one or more of 40A, 40B, 40C. To determine a noise parameter 316 can be based on the first speech parameter SP_1. For example, the noise estimator 316 may be configured to update the noise parameter NP in accordance with the first speech parameter SP_1 being indicative of non-speech, i.e. non-presence of speech.

The speech detector 318 may be configured to determine and output, optionally to first gain compensation determiner 306, a second speech parameter SP_2 indicative of speech based on the first microphone input signal and the second microphone input signal, e.g. based on one or more speech feature associated with one or more of signals 30, 32, 17A, e.g. a speech feature included in one or more of 40A, 40B, 40C.

In first gain compensation determiner 306, to determine the first distractor attenuation parameter DAP_1 is optionally based on a detection of presence of main speech, i.e. based on the second speech parameter SP_2. In other words, the first distractor attenuation parameter DAP_1 can be set to a pass-through value, i.e no attenuation, in accordance with the second speech parameter being indicative of presence of main speech. In accordance with the second speech parameter being indicative of non-presence of main speech, the first distractor attenuation parameter DAP_1 can be set according to the first distractor indicator DI_1 and/or the noise parameter NP.

The first gain compensation determiner 306 may comprise a limiting functionality to the first distractor attenuation parameter DAP_1. In other words, to determine the first distractor attenuation parameter DAP_1 can include to determine whether a first limit criterion 326 is satisfied. The first limit criterion may be based on the noise parameter.

The first limit criterion 326 may be satisfied when the noise parameter, such as low-frequency noise parameter is larger than a first threshold. In accordance with a determination that the first limit criterion 326 is satisfied, to determine the first distractor attenuation parameter DAP_1 comprises to limit the first distractor attenuation parameter CGP_1 based on a first gain limit CL_1.

The primary attenuator 23A optionally comprises a beamformer performance estimator 322 configured to determine a beamformer performance parameter BFPP. In other words, to process the first microphone input signal 30 and the second microphone input signal 32 can include to determine a beamformer performance parameter BFPP indicative of a performance of a beamformer on the first microphone input signal 30 and the second microphone input signal 32. To determine a second distractor attenuation parameter DAP_2 can be based on the second distractor indicator DI_2 and the beamformer performance parameter BFPP. The beamformer performance parameter BFPP can be based on non-voice presence control signal 204A, such as from a non-voice activity detector 204, and voice presence control signal 202A, such as from a voice activity detector 202. The beamformer performance parameter BFPP can be based on OF_1_1 and OF 2_1 as described above in relation to the first distractor indicator. For example, the beamformer performance parameter BFPP can be based on a ratio between OF_1_1 and OF_2_1.

To determine the second distractor attenuation parameter DAP_2 can include to determine whether a second limit criterion 330 is satisfied, and in accordance with a determination that the second limit criterion 330 is satisfied, optionally limit the second distractor attenuation parameter DAP_2 based on a second gain limit.

Figure 5:
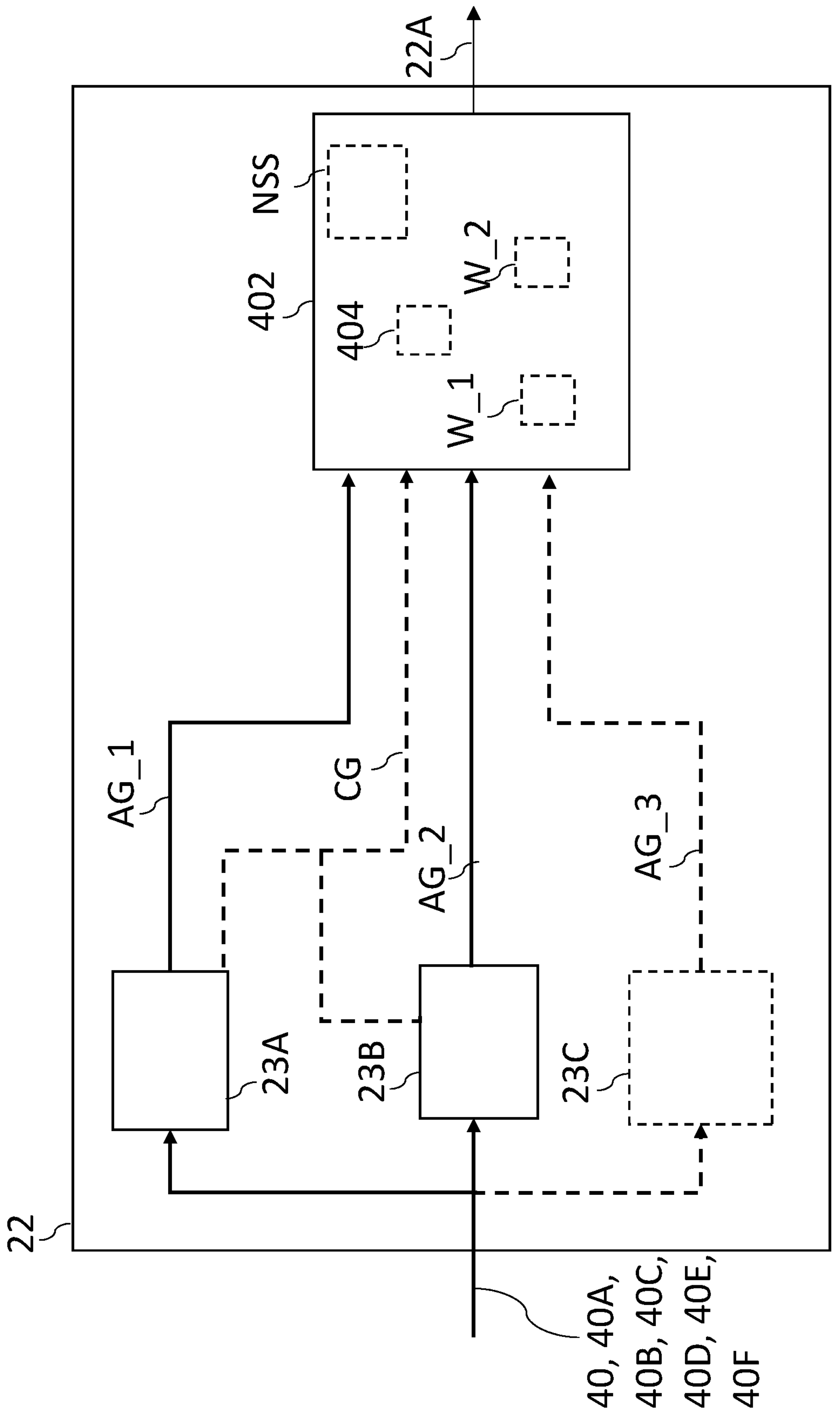
FIG. 5 illustrates an example suppressor module according to the disclosure.

FIG. 5 illustrates an example suppressor module 22 of the audio device 10. The suppressor module 22 discussed with respect to FIG. 5 may include any or all of the components, such as primary attenuator 23A, discussed above with respect to FIG. 4. It is to be noted that the primary attenuator 23A may be implemented in other ways than described in relation to FIG. 4. For example, the primary attenuator 23A may be implemented to attenuate other noise sources than a distractor.

The suppressor module 22 comprise one or more attenuators including a primary attenuator 23A and/or a secondary attenuator 23B. The one or more attenuators optionally comprises a tertiary attenuator 23C.

For example, the processor/suppressor module 22 can be configured to determine a primary gain AG_1 also denoted primary attenuator gain with the primary attenuator 23A based on one or more features 40, 40A, 40B, 40C, 40D, 40E, 40F associated with one or more of signals, 30, 32, 17A, 17B, such as the first microphone input signal 30 and the second microphone input signal 32. The primary attenuator 23A can be a distractor attenuator configured to determine the primary gain AG_1 based on a front plane near field noise feature associated with the first microphone input signal 30 and the second microphone input signal 32. In other words, the primary attenuator 23A can be a distractor attenuator as described in relation to FIG. 4

The processor/suppressor module 22 can be configured to determine a secondary gain AG_1 also denoted secondary attenuator gain with the secondary attenuator 23B based on one or more features 40, 40A, 40B, 40C, 40D, 40E, 40F associated with one or more of signals, 30, 32, 17A, 17B, such as the first microphone input signal 30 and the second microphone input signal 32. The secondary attenuator 23B can be a static noise attenuator configured to determine the secondary gain AG_2 based on a static noise feature also denoted second common input feature CIF_2 of common input feature(s) 40F associated with the first microphone input signal 30 and the second microphone input signal 32.

The processor/suppressor module 22, such as suppressor controller 402, can be configured to determine a noise suppression scheme NSS based on the primary gain AG_1 and the secondary gain AG_2. The processor/suppressor module 22, such as suppressor controller 402 can be configured to apply the noise suppression scheme NSS by providing suppressor output 22A indicative of the noise suppression scheme NSS to combiner module 24 for provision of the combined signal 34 that is converted to the output audio signal 36, see FIG. 1.

The processor/suppressor module 22 can be configured to optionally determine a tertiary gain AG_3 with a tertiary attenuator 23C based on one or more features 40, 40A, 40B, 40C, 40D, 40E, 40F associated with one or more of signals, 30, 32, 17A, 17B, such as the first microphone input signal 30 and the second microphone input signal 32. To determine a noise suppression scheme NSS can therefore be based on the primary gain AG_1, the secondary gain AG_2, and the tertiary gain AG_3. The tertiary attenuator 23C can be a noise attenuator configured to determine the tertiary gain AG_3, e.g. based on a vehicle noise feature associated with the first microphone input signal 30 and the second microphone input signal 32. A vehicle noise feature can be one or more of: a car noise feature, a train noise feature, a boat noise feature, and a plane noise feature. The tertiary attenuator 23C can be configured to determine the tertiary gain AG_3 based on a user selection parameter and one or more features 40, 40A, 40B, 40C, 40D, 40E, 40F associated with one or more of signals, 30, 32, 17A, 17B, such as the first microphone input signal 30 and the second microphone input signal 32.

As shown in FIG. 5, a noise suppression scheme NSS can be determined in the suppressor module 22/suppressor controller 402. To determine a noise suppression scheme NSS can include to determine a first weight factor W_1 of the primary gain AG_1 and a second weight factor W_2 of the secondary gain AG_2. To determine a noise suppression scheme NSS based on the primary gain Ag_1 and the secondary gain AG_2 can include to determine the noise suppression scheme NSS based on the primary gain AG_1, the first weight factor W_1, the secondary gain AG_2, and the second weight factor W_2. The first weight factor and/or the second weight factor may be frequency-dependent.

The noise suppression scheme NSS can be determined via a number of different approaches. For examples, to determine a noise suppression scheme NSS based on the primary gain AG_1 and the secondary gain AG_2 can include to determine the noise suppression scheme NSS based on the primary gain AG_1 multiplied with the secondary gain AG_2. Alternately, or in conjunction with, to determine a noise suppression scheme NSS based on the primary gain AG_1 and the secondary gain AG_2 can include to determine the noise suppression scheme NSS based on the primary gain AG_1 added with the secondary gain AG_2.

To determine a noise suppression scheme NSS can also include to combine the primary gain AG_1 and the secondary gain AG_2 into a combined gain CG. Further, it can include to apply a compensation function 404 to the combined gain CG for provision of a compensated gain. To determine a noise suppression scheme NSS may include to determine the noise suppression scheme NSS based on the compensated gain output from compensation function 404. The compensation function 404 can be determined to increase one or more of a speech intelligibility and a listening comfort of the output audio signal.

To process the first microphone input signal 30 and the second microphone input signal 32 can include to apply a first beamforming to the first microphone input signal 30 and the second microphone input signal 32 for provision of the first beamforming output signal 17B.

The primary gain AG_1 can be determined to attenuate or suppress a first noise signal, e.g. of noise being a first type of noise, in the first beamforming output signal 17A and the secondary gain AG_2 can be determined to attenuate or suppress a second noise signal, e.g. of noise being a second type of noise different from the second type of noise, in the first beamforming output signal 17A. The first noise signal can be different from the second noise signal.

Figure 6:
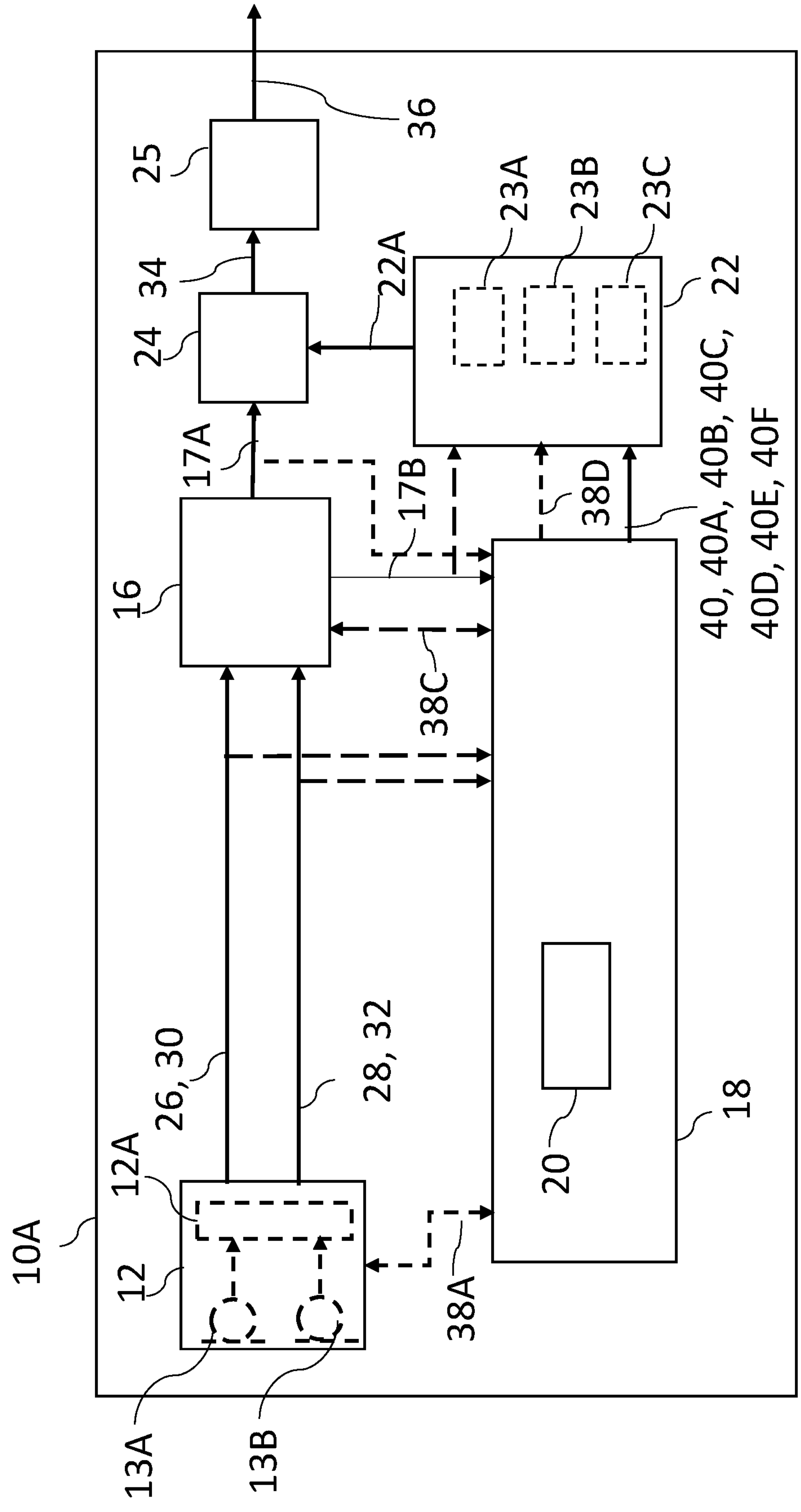
FIG. 6 illustrates an example in-ear audio device according to the disclosure.

FIG. 6 illustrates an example audio device 10A without pre-processor module 14, wherein the output from filter bank(s) is used as first microphone input signal and second microphone input signal. In other words, the first microphone signal is used as the first microphone input signal, and the second microphone signal is used as the second microphone input signal.

It may be appreciated that the figures comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in the order presented.

Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, modules, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

10, 10A audio device
12 input module
12A filter bank
13A first microphone
13B second microphone
14 pre-processor module
16 beamformer module
17A first beamforming output signal
17B second beamforming output signal
18 controller
20 feature extractor
22 suppressor module
22A suppressor output
23A primary attenuator, distractor attenuator
23B secondary attenuator
23C tertiary attenuator
24 combiner module
25 output module
26 first microphone signal
28 second microphone signal
30 first microphone input signal
32 second microphone input signal
34 combined signal
36 output audio signal
38 control signal
38A input module control signal
38B pre-processor module control signal
38C beamformer module control signal
38D suppressor module control signal
40 features associated with one or more of signals 26, 28, 30, 32, 17A, 17B
40A first input feature(s) associated with first microphone input signal
40B second input feature(s) associated with second microphone input signal
40C first output features associated with first beamforming output signal
40D second output features associated with the second beamforming output signal 40E common output features associated with the first beamforming output signal and the second beamforming output signal
40F common input features associated with the first microphone input signal and the second microphone input signal
102 gain compensation scheme
102A first gain compensation
102B second gain compensation
104 test compensation schemes
105A first test gain
105B second test gain
108A first microphone test signal
1086 second microphone test signal
110 test beamformer
112 first test beamforming
112A first test beamforming output
114 second test beamforming
114A second test beamforming output
116 compensation scheme controller
118A first gain control signal
118B second gain control signal
118C test compensation scheme control signal
118D beamform control signal
202 voice activity detector
202A voice presence control signal
204 non-voice activity detector
204A non-voice presence control signal
206 first covariance matrix/parameter(s)
208 second covariance matrix/parameter(s)
210 first beamformer
212 second beamformer
218 first update criterion
220 second update criterion
224 forgetting factor determiner
226, 226A, 226B forgetting factor
302 determiner of first distractor indicator
304 determiner of second distractor indicator
306 first gain compensation determiner
308 second gain compensation determiner
312 attenuation gain determiner
314 noise suppression scheme
316 noise estimator
322 beamformer performance estimator
402 suppressor controller
404 compensation function
AG_1 primary gain, primary attenuator gain
AG_2 secondary gain, secondary attenuator gain
AG_3 tertiary gain, tertiary attenuator gain
BFPP beamformer performance parameter

The invention claimed is:

1. An audio device comprising an interface, memory, and a processor, wherein the processor is configured to:

obtain a first microphone input signal and a second microphone input signal;

process the first microphone input signal and the second microphone input signal for provision of an output audio signal;

determine a forgetting parameter based on the first microphone input signal and the second microphone input signal; and output the output audio signal, wherein to process the first microphone input signal and the second microphone input signal, the processor is further configured to:

determine a first set of covariance parameters based on the first microphone input signal and the second microphone input signal;

determine a second set of covariance parameters based on the first microphone input signal and the second microphone input signal;

determine a first beamforming based on the first set of covariance parameters and the second set of covariance parameters;

apply the first beamforming to the first microphone input signal and the second microphone input signal for provision of a first beamforming output signal;

determine a second beamforming based on the first set of covariance parameters and the second set of covariance parameters;

apply the second beamforming to the first microphone input signal and the second microphone input signal for provision of a second beamforming output signal;

provide the output audio signal based on the first beamforming output signal and the second beamforming output signal, wherein the first beamforming is determined to increase a relative amount of speech of a user in the first beamforming output signal and wherein the second beamforming is determined to decrease a relative amount of speech of the user in the second beamforming output signal; and update at least one of the first covariance parameters or the second covariance parameters based on the forgetting parameter.

2. The audio device according to claim 1, wherein the processor is further configured to, in accordance with a first update criterion being satisfied, update the first set of covariance parameters based on voice presence control signal received from a voice activity detector.

3. The audio device according to claim 1, wherein the processor is further configured to, in accordance with a second update criterion being satisfied, update the second set of covariance parameters based on non-voice presence control signal received from a non-voice activity detector.

4. The audio device according to claim 1, wherein at least one of the first beamforming or the second beamforming is implemented as generalized eigenvalue beamforming using blind analytical normalization.

5. The audio device according to claim 1, wherein to apply the first beamforming comprises to maximize a signal-to-noise ratio of a main speaker.

6. The audio device according to claim 1, wherein to apply the second beamforming comprises to maximize a noise-to-signal ratio.

7. The audio device according to claim 1, wherein the processor is further configured to determine at least one of the first beamforming or to determine the second beamforming based on a common first set of covariance parameters and a common second set of covariance parameters.

8. The audio device according to claim 1, wherein the processor comprises:

a feature extractor for provision of features associated with signals in the audio device; and a controller configured to control at least one of the first beamforming or the second beamforming based on one or more features.

9. The audio device according to claim 8, wherein the feature extractor is configured to determine one or more first input features associated with the first microphone input signal, and wherein the controller is configured to control at least one of the first beamforming or the second beamforming based on one or more features of the first input features.

10. The audio device according to claim 8, wherein the feature extractor is configured to determine one or more second input features associated with the second microphone input signal, and wherein the controller is configured to control at least one of the first beamforming or the second beamforming based on one or more features of the second input features.

11. The audio device according to claim 8, wherein the feature extractor is configured to determine one or more first output features associated with the first beamforming output signal, and wherein the controller is configured to control at least one of the first beamforming or the second beamforming based on one or more features of the first output features.

12. The audio device according to claim 8, wherein the feature extractor is configured to determine one or more second output features associated with the second beamforming output signal, and wherein the controller is configured to control at least one of the first beamforming or the second beamforming based on one or more features of the second output features.

13. The audio device according to claim 8, wherein the feature extractor is configured to determine one or more common output features associated with the first beamforming output signal and the second beamforming output signal, and wherein the controller is configured to control at least one of the first beamforming or the second beamforming based on one or more features of the common output features.

* * * * *